United States Patent [19]

Fort

[11] 4,320,472
[45] Mar. 16, 1982

[54] DIGITAL GEOPHONE SYSTEM

[75] Inventor: J. Robert Fort, Pasadena, Calif.

[73] Assignee: United Geophysical Corporation, Pasadena, Calif.

[21] Appl. No.: 851,290

[22] Filed: Nov. 14, 1977

Related U.S. Application Data

[63] Continuation-in-part of Ser. No. 521,158, Nov. 5, 1974, abandoned.

[51] Int. Cl.³ .............................................. G01V 1/22
[52] U.S. Cl. ...................................... 367/79; 367/76; 370/113; 340/870.13
[58] Field of Search ........... 340/15.5 TS, 183, 870.13; 367/76–79; 370/112, 113, 100

[56] References Cited

U.S. PATENT DOCUMENTS

| | | | |
|---|---|---|---|
| 3,062,315 | 11/1962 | Herzog | 340/15.5 TS |
| 3,349,390 | 10/1967 | Glassman | 340/347 AD |
| 3,453,597 | 7/1969 | Pomerene | 340/167 R |
| 3,534,257 | 10/1970 | Charap et al. | 340/347 AD |
| 3,564,406 | 2/1971 | Henderson et al. | 340/347 AD |
| 3,593,293 | 7/1971 | Rorholt | 340/152 R |
| 3,618,000 | 11/1971 | Carruth, Jr. | 340/15.5 DP |
| 3,652,979 | 3/1972 | Angelle | 340/15.5 TS |
| 3,665,305 | 5/1972 | Petrohilos | 340/347 AD |
| 3,748,638 | 7/1973 | Montgomery, Jr. et al. | 340/15.5 TS |
| 3,793,488 | 2/1974 | King | 179/15 BA |
| 3,806,864 | 4/1974 | Broding et al. | 340/15.5 TS |
| 3,866,175 | 2/1975 | Seifert, Jr. | 340/151 |
| 3,868,677 | 2/1975 | Kidd | 340/347 AD |
| 3,886,494 | 5/1975 | Kostelnicek et al. | 340/15.5 TS |
| 3,916,371 | 10/1975 | Broding | 340/15.5 TS |
| 3,959,767 | 5/1976 | Smither et al. | 340/15.5 DP |
| 3,990,036 | 11/1976 | Savit | 340/15.5 TS |
| 4,086,504 | 4/1978 | Ezell et al. | 340/15.5 TS |

FOREIGN PATENT DOCUMENTS 800496 8/1958 United Kingdom ................ 340/347

OTHER PUBLICATIONS

"Analog–Digital Conversion Handbook", Analog Devices, Inc., Jun. 1972, pp. 11-17 to 11-21.

Primary Examiner—Howard A. Birmiel
Attorney, Agent, or Firm—Reed C. Lawlor; Robert C. Smith

[57] ABSTRACT

This invention is concerned with systems for converting seismic waves received at various points at the surface of the earth into digital signals and the transmission of those digital signals from the geophone stations to a recording truck. Address registers located at the geophones are employed to permit periodic selective interrogation of the individual geophones. Typically, electric signals generated in the geophones, such as digital seismic signals, are time-multiplexed for return to a recorder over a common cable.

19 Claims, 13 Drawing Figures

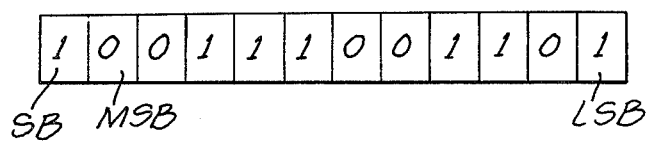
FIG. 4.
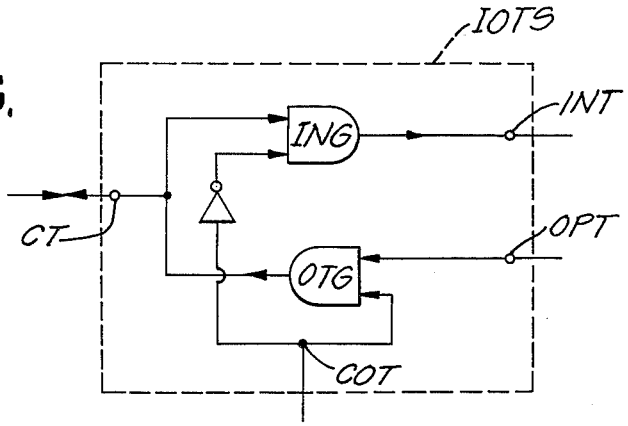
FIG. 6.
FIG. 7.
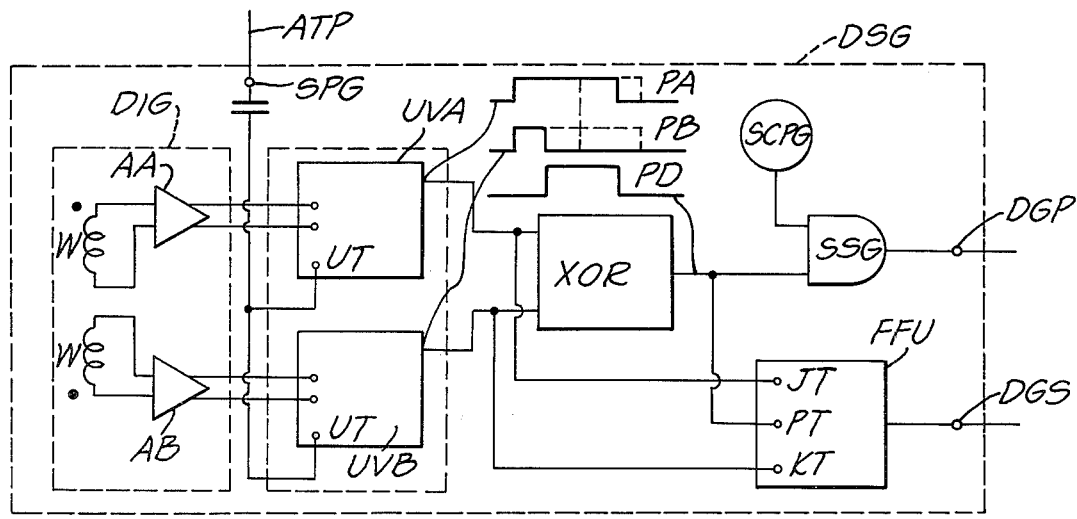
FIG. 5.
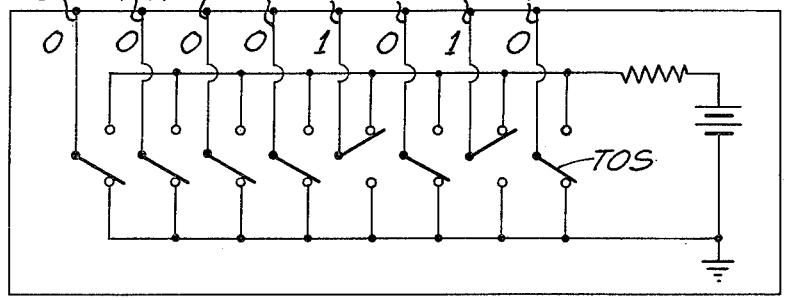

DIGITAL GEOPHONE SYSTEM

INTRODUCTION

This application is a continuation-in-part of application Ser. No. 521,158 now abandoned, filed Nov. 5, 1974.

This invention relates to an improved system for employing seismic techniques for surveying the subsurface structures of the earth.

BACKGROUND

Many methods are currently in use which involve the generation of seismic waves at the surface of the earth and the recording of seismic waves at the surface after they have traveled downwardly into the earth, encountered subsurface anomalies of various kinds, and then have been deflected upwardly to the surface as by reflection, refraction, and diffraction. Numerous methods of generating the seismic waves are in use. So also are numerous methods for recording and processing the seismic waves. When these methods are used to determine the nature and structure of subsurface formations, they are called seismic surveying, and when the objective of the survey is to locate mineral deposits, the methods are sometimes referred to as seismic prospecting.

As currently practiced, seismic prospecting generally involves digitizing the received seismic waves and making magnetic tape recordings of digitized seismic waves and transporting the magnetic tape recordings to a computer center where they are processed in an effort to determine the nature and structure of subsurface formations.

Many different methods are employed for generating the seismic waves at or near the surface of the earth. They may be generated there in the form of a single sharp impulse, such as by detonation of an explosive at the bottom of a bore hole that has been drilled into the earth to a depth below the weathered layer. Sometimes the pulse is created by dropping a weight onto the surface of the earth, or by application of an impact to the surface of the earth, such as by pounding the earth with a piston or plate driven by a gas explosion. The point or area at which the seismic waves are generated is often called a shotpoint.

In another method of seismic prospecting as currently conducted, a train of seismic waves in the form of a "chirp" signal is generated in place of a sharp pulse, at the source.

A chirp signal is a frequency modulated wave of substantial duration in which the frequency is varied as a function of time, often a linear function, over a substantial period of as much as several seconds. The length of a chirp is to be contrasted with a duration of a single seismic impulse produced by the methods described above, wherein the total duration of the signal emitted from the source is only a small fraction of a second, such as about 0.05 sec. or less. Sometimes a chirp signal is referred to as a "sweep" since the frequency is swept from one value to another during such action.

After deflection by subsurface formations, the waves are detected at points at or near the surface of the earth by means of electromechanical transducers, sometimes called geophones or seismometers. Sometimes they are detected by means of an array of interconnected geophones arranged in predetermined relation to a geophone station. The combined waves from these transducers are often said to be received at the geophone station. Conventionally, the geophones convert the received seismic wave into a corresponding electrical voltage of analog form.

It has been common practice to transmit the seismic wave voltages developed at a set of geophone stations over a corresponding set of conductors to a recording system in the truck, or other recording vehicle. There the seismic wave voltages are multiplexed, then converted into digital signals, and then recorded in multiplexed form on a magnetic tape. The resultant record is called a digitized seismogram.

Such a prior art system generally requires the use of a separate pair of conductors for each geophone station. Thus where there are 24 geophone stations, 24 pairs of conductors are involved for transmitting the seismic wave signals to the recording vehicle.

When a chirp source signal is employed, the resultant recorded waves are cross-correlated with a replica of the original chirp signal in order to produce a record somewhat similar to that which would be produced if the original seismic wave had been in the form of an impulse. To achieve such a result, the received seismic waves are conventionally recorded on a magnetic tape along with a record of the chirp signal and the recorded seismic waves are cross-correlated with the record of the chirp signal at a computer center or in the truck. In order to increase the signal-to-noise ratio, a chirp signal may be separately produced 20 to 100 times at about the same shotpoint and received at the same receiver point and the resultant received waves subjected to equal-time compositing. The most commonly used seismic prospecting process involving the use of a chirp signal and the correlation of the chirp signal with the seismic records is known as "Vibroseis" (trademark of Continental Oil Company). For convenience, we will sometimes refer to such processes as a Vibroseis-type process.

Terminology

A few terms frequently used herein are briefly explained as follows:

Geophone Station

This is a point at which a single geophone is located, or about which an array of geophones is deployed in a predetermined manner. The signals received by all the geophones in the group are usually added together or otherwise combined to form a single signal. This signal is attributed to the geophone station.

Shot

The term shot applies to a single train of seismic waves whether it be generated by explosive, an impact, or a Vibroseis source. Where several shots are initiated simultaneously or in timed sequence to produce a single train of waves as if from a single source without interruption, they are also considered a shot.

Shot Point

This is the point at the surface of the earth at which seismic waves are to be generated. Where a single explosive charge is involved, technically the shot point is at the bottom of the shot hole, but the term is often used to refer to the point on the surface directly above the charge. Where several explosive charges of equal strength are involved and are laid out with uniform spacing, the shot point is at the center of the group of the charges. The term shot point is also applied where the impulse is applied to the earth by one or more impacts or the chirp is applied by means of a vibrator. Where, as in the case typically described herein, several vibrators are employed along the same line for applying signals to the earth simultaneously, the shot point is deemed to be on the surface of the earth at the center of the points at which the vibrations are applied.

Recording Unit

A recording unit may be in the form of a cab carried by a land vehicle, usually a truck, within which the recording equipment is installed. The recording unit may be in the form of cab carried on a trailer, or of other land vehicle, which is hauled by a truck or otherwise. The vehicle may move on wheels, tracks, or even sleds.

Shooting Truck

This is the truck which includes the equipment which is used for generating the seismic waves, whether the wave be generated in the form of an impulse from an explosion of dynamite or from impacting the earth. The term also applies to a land vehicle which carries a vibrator, such as one that applies a vibrating force to the surface of the earth under the control of a chirp excitation signal, thus causing the earth to undulate at the point of application of the force with a frequency and amplitude corresponding to that of the applied excitation signal. Again, a trailer unit may be considered a truck.

Source Area

This is an area such as one along the line of exploration, in which are located a series of shot points that are closely spaced. Usually a source area extends over the distance of only a few, often only two, geophone stations.

Geophone Spread

This term is applied to a line of geophone stations at which waves are received from a common shot. The received waves are usually capable of being vertically stacked to enhance the signal-to-noise ratio.

Setup

A setup is a combination of a particular geophone spread with a particular shot point. However, the term can sometimes be applied where the actual succession of shots occur at different points in a source area, especially if the points are so close together that equal-time compositing is applicable. Sometimes a setup is called a profile in the seismic prospecting art.

Numerous other terms will be introduced and defined from time to time. Still others will be used in a manner common in the art without definition. In some cases, because of the nature of language, a term may have more than one meaning. An effort will be made in the following description to use words in context which will render their meaning clear to those skilled in the art, thus avoiding the necessity for defining all terms that are used herein.

GENERAL DESCRIPTION OF INVENTION

In the present invention, the seismic-wave voltages are periodically converted into digital signals on command at or near the respective geophone stations and these digital seismic signals are transmitted from the respective geophone stations at different times so that they arrive at the recording vehicle in multiplexed form. In one form of the invention, the electrical digital signals represent the amplitude of the seismic wave signals. In another form of the invention, the electrical digital signals represent a phase characteristic of the received seismic waves.

At the recording vehicle, the digitized signals are processed and then recorded in multiplexed form on a magnetic tape. This tape is made available for analysis in accordance with methods applicable to other multiplexed seismic wave recordings. The reproduced signals may be recorded in digital form or they may, ultimately at least, be recorded in analog form. The digital record may be made in may different formats to suit the requirements of the user. By way of example, they may be recorded in one of the formats described in an article by Northwood et al, "Recommended Standards for Digital Tape Formats", (32 SE 1073–1084). They may also be recorded in a standard 1010 format, if desired. The term 1010 refers to the format that is employed in a 1010/1011 system seismic data recording system that has been manufacured by Scientific Data Systems.

In the best mode of practicing the invention a unique identification number or address is associated with each respective geophone station and means arranged at the respective geophone station to detect when an incoming signal includes the address of the respective geophone station. And an address generator is located in the recording truck to facilitate sequential interrogation of the geophone stations in the spread. With this invention when an address of a particular geophone station is detected, apparatus at that geophone station is activated to transmit to the truck both digital seismic signals representing the seismic waves at that geophone station and the address of that geophone station. Such addresses are used at the truck for identifying the geophone stations at which respective digital seismic signals were received.

One advantage of converting the seismic wave voltages into digital signals at the geophone stations is that the digital signals corresponding to the respective stations may be transmitted sequentially over the same pair of conductors. This makes it possible to utilize a cable between the geophone stations and the recording truck which employs fewer conductors than are usually employed and hence a cable of lighter weight and lower cost. Another advantage involves the fact that stray electrical noise picked up on the cable is that such digital signals may be more easily distinguished in the recording process because such noise signals are generally of analog character and of a frequency which falls within the spectrum of seismic wave signals.

In one way of employing the invention, a computer is installed in the recording truck and it is programmed to transmit addresses of successive geophones one at a time so that digital seismic wave signals may be transmitted to the recording truck one at a time in multiplexed form as mentioned. Though the invention is described in detail as practiced in a system in which signals are transmitted by cable between the geophones and a recorder, it will be understood that it may also be practiced in a system in which the signals are transmitted by radio.

DRAWINGS

Various features of the invention are described more fully in the detailed description thereof that is set forth below.

IN THE DRAWINGS

FIG. 4 is a diagram representing a digital seismic signal;

FIG. 5 is a schematic diagram representing a geophone address register;

FIG. 6 is a diagram of a transfer switch employed in the geophone and in the truck;

FIG. 7 is a schematic diagram of a seismic signal transducer;

The invention will be described herein primarily in relation to a system in which analog electrical signals developed at the geophone and in accordance with the amplitude of the received waves are converted into electrical digital signals.

DETAILED DESCRIPTION OF INVENTION

Figure 1:
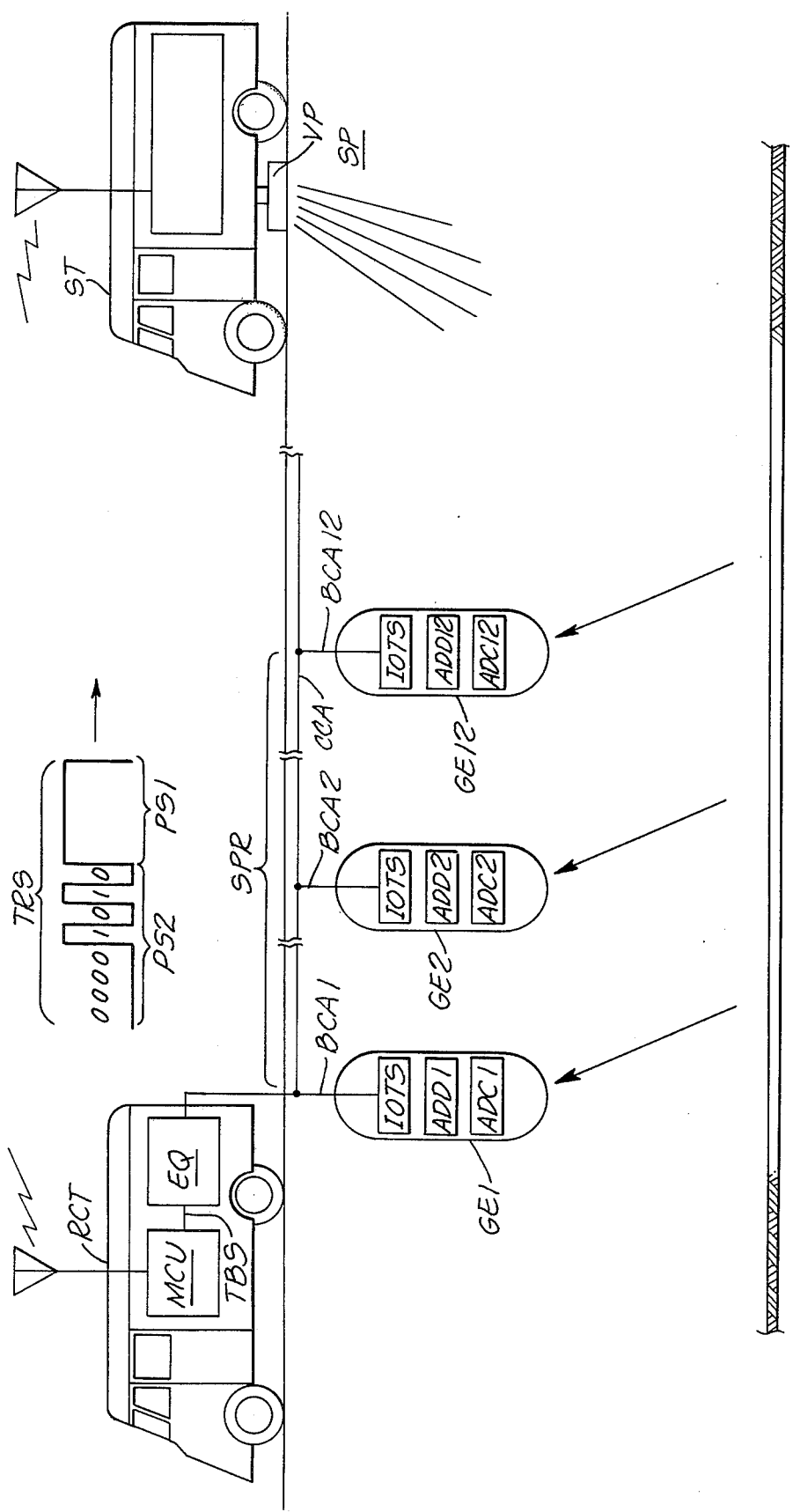
FIG. 1 is a schematic diagram of a system for geophysical prospecting employing the invention.

In FIG. 1 a seismic exploration system is illustrated embodying features of this invention. In this system, a number of digital geophones GE1, GE2, ..., GE12 are arranged at spaced points or stations in a spread SPR along the surface of the earth. Typically, the stations at which the geophones are located are 25 feet to 200 feet apart, depending upon the nature of the area being surveyed and the accuracy with which it is desired to conduct the survey. As used herein the term seismic digital geophone refers to a device that responds to motion of the earth to generate a digital signal that represents some characteristic or property of that motion. Typically the digital signal is a multibit binary signal in which a sign bit represents the direction or sign of the characteristic or the motion and the remaining bits represent the amplitude of the motion.

Each of the digital geophones GE1, GE2 ... GE12 is connected by a branch cable BCA1, BCA2, ... BCA12 to a single common cable CCA which has one end terminating at electrical equipment EQ in the truck. The common cable CCA may be in the form of a coaxial conductor or a twisted pair of conductors and the two conductors of the common cable CCA is connected by a pair of conductors in the respective branch cables BCA1, BCA2, ..., BCA12 to electrical equipment contained within the respective geophones GE1, GE2, ..., GE12.

The geophones GE1, GE2, ... GE12 receive seismic waves that have been generated at a shot point or seismic source SP after the waves have been returned to the surface of the earth. The seismic waves are generated at a shooting truck ST according to radio signals received from a recording truck RCT under control of a master control unit MCU. The master control unit also issues a time break signal TBS that initiates the operation of equipment EQ as more fully explained later.

Each of the geophones GE1, GE2, ..., GE12 includes an electrical unit EU that is more fully described hereinbelow. Electrical power for the equipment in each geophone is supplied by one or more electric batteries contained within the respective geophones, or, alternatively through the common conductor CCA from a power source in the recording truck RCT.

Each of the geophones GE1, GE2, ... GE12 has an input/output transfer switch IOTS connected at its input. This switch is characterized by two states, an inputting state and an outputting state. When the geophones are in use, the input/output switches IOTS are normally in their inputting state so that signals transmitted to the geophones from the electrical equipment EQ over the common conductor cable CCA may be transferred into the electrical unit within all of the geophones simultaneously. Each of the geophones also includes an address detector ADD1, ADD2, ... ADD12, which receives the incoming signals and detects whether an address signal present in the incoming signal corresponds to the address that identifies one of the individual geophones. Each of the geophones is characterized by a unique address so that only a specific geophone that is being addressed becomes activated. In the embodiment of the invention described, each of the geophones, upon activation, generates a multibit binary digital seismic signal representative of a characteristic of the seismic wave being received at the time of activation and this digital signal together with the identifying code, or address, signal is transmitted out of the geophone over the common conductor cable CCA to the equipment EQ aboard the recording vehicle. The respective geophones GE1, GE2, ..., GE12 are addressed one at a time at intervals spaced sufficiently far apart in time to permit the digital seismic signals to be generated within the respective geophones and returned with the identifying code to the equipment EQ before the next geophone is addressed, but to be addressed repeatedly at times sufficiently close together to permit the sampling of seismic waves at all geophones in the spread at regular sampling intervals of 4 ms or less.

In order to activate the respective geophones and to receive digital seismic signals from them one at a time in sequence, a series of interrogation, or calling, signals are generated in the equipment EQ and they are transmitted one at a time over the common cable CCA in order to address the respective geophones one at a time in programmed sequence.

Figure 3:
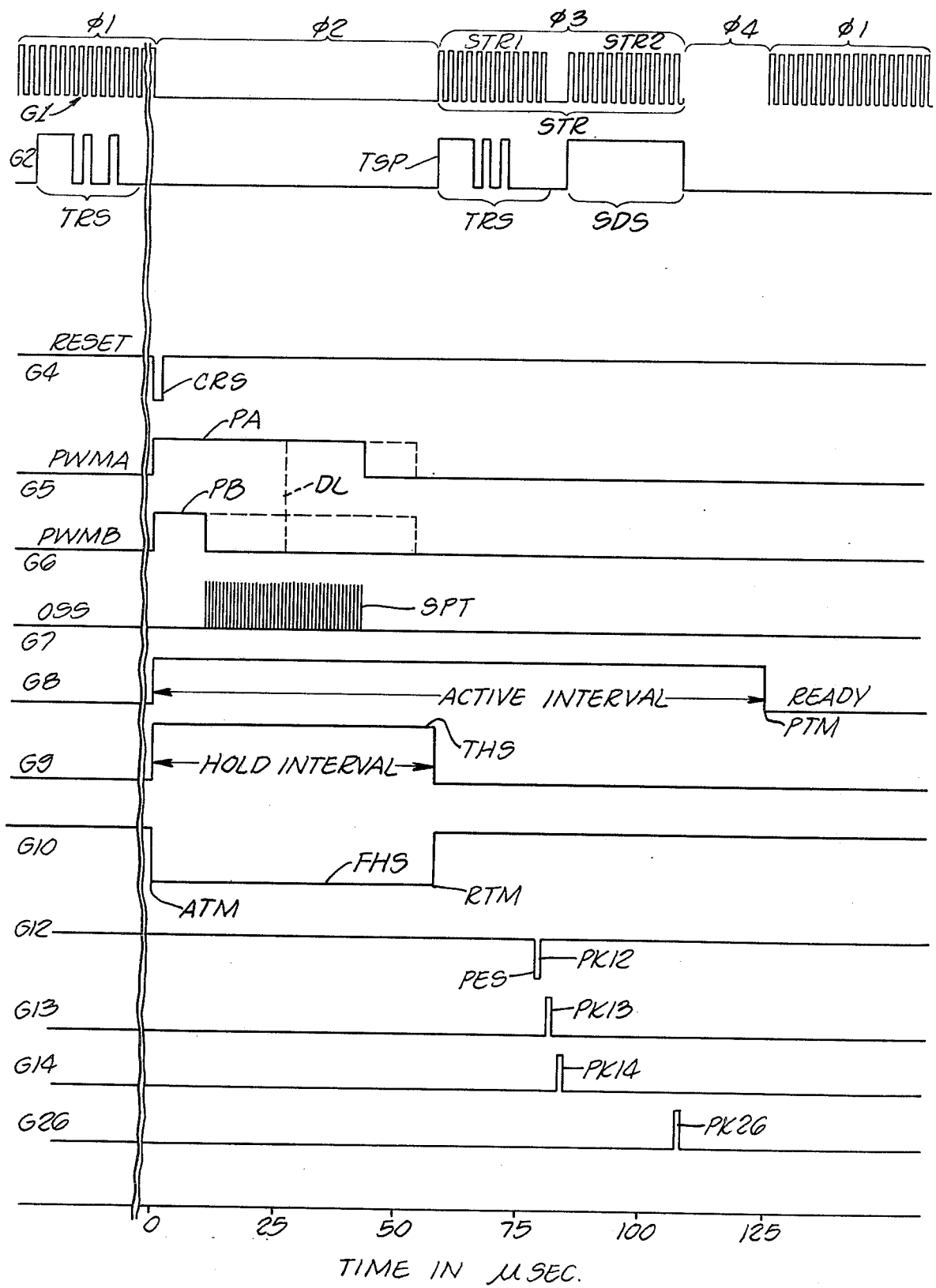
FIG. 3 is a timing diagram employed for explaining sequencing of operations in a digital geophone, in accordance with the invention.

Each interrogation signal TRS consists of two parts as indicated in FIGS. 1 and 3. One part PS1 represents the operating code OPCODE and the other PS2 represents a sensor or geophone station address SAD. The OPCODE signal consists of four pulses representing four respective bits, each of which is either 1 or 0. The values represented by the bits of the OPCODE signal may be 1111 as indicated in FIGS. 1 and 3. The sensor address signal SAD consists of eight bits each of which may have a value of 1 or 0. For example, the sensor address signal may represent the binary number 00001010 as illustrated in FIGS. 1 and 3, corresponding to an address of 10, in decimal notation.

Though only four bits are needed in the address to represent the address of 12 geophones, eight bits are employed so that the geophone addresses may exceed 12, thus facilitating the addressing of any number of geophones up to a total of 256. Where only 12 recording channels are employed in the equipment EQ any 12 geophones of a total of 256 may be addressed one at a time. Thus, geophones 1–12 may be addressed first, then geophones 2–13 may be addressed next, and then geophones 3–14 may be addressed next, etc. The ordinal or sequence numbers of the geophones in the spreads may correspond to their addresses.

In the embodiment of the invention illustrated, the equipment EQ in the truck includes means for applying interrogation signals including the operation code signal OPCODE and the sensor address signal SAD to the common cable CCA as more fully described hereinafter. A series of such interrogation signals are applied to the common cable CCA one at a time in order to activate the geophones GE1, GE2, . . . , GE12 one at a time so as to return a digital seismic signal from the geophone together with copy of the interrogation signal TRS that activated it. Such signals are returned from all the geophones in time-multiplexed form over the common cable CCA to the equipment EQ for recording and processing.

Figure 2:
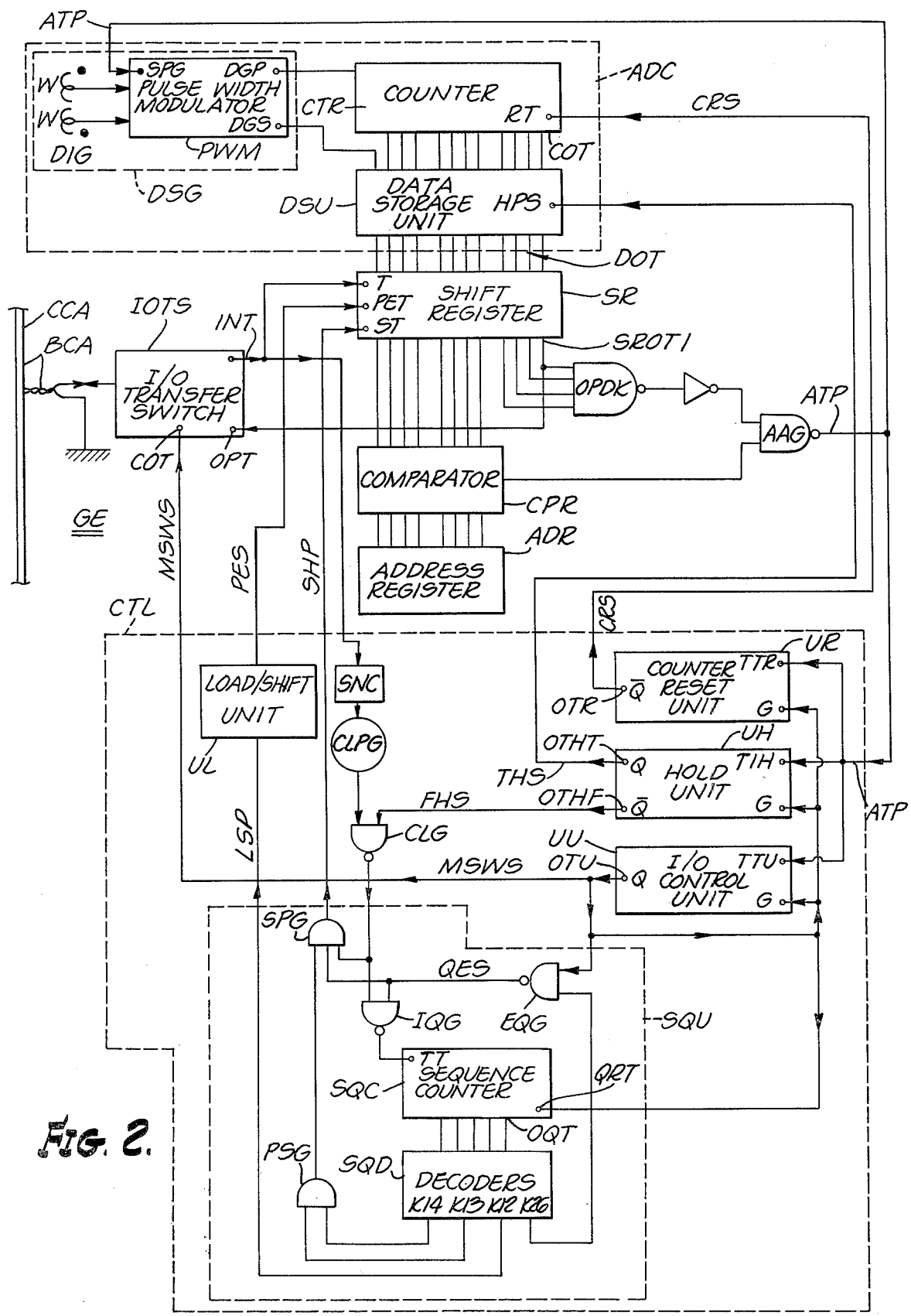
FIG. 2 is a block diagram of an addressable digital geophone employed in the invention.

A digital geophone of the type that may be employed in this invention is illustrated in FIG. 2. This digital geophone GE is typical of the geophones GE1, GE2, . . . , GE12 of FIG. 1.

In the embodiment of the invention illustrated, a digital geophone GE includes an analog-to-digital converter ADC which comprises a digital seismic signal generator DSG, a counter CTR, and a data storage unit DSU. The digital seismic signal generator DSG responds to seismic wave voltages generated by a differential geophone DIG to produce at its output DGP a spurt or bundle of pulses SPT (see FIG. 3) representing the amplitude of the received seismic wave and at its output DGS a digital signal which indicates the sign of the received seismic wave. The number of pulses in the bundle SPT developed at the output terminal DGP depends upon the amplitude of the received seismic wave, increasing with the amplitude of that wave. The creation of the bundle or spurt of pulses and the creation of the sign signal is initiated by means of a trigger pulse ATP that is applied to the digital seismic signal generator DSG when the digital geophone GE is activated by the interrogation signal TRS, as more fully described hereinbelow.

Prior to the application of the activation pulse ATP, the counter CTR and the data storage unit DSU are in their quiescent, or rest, state with 0's stored in their various registers.

The counter CTR is a conventional 11-bit pulse counter which counts up to 2048 pulses. Initially, upon activation, the counter CTR is also in a state corresponding to a count of 0. The counter CTR is set in the rest or 0 states by a reset signal CRS supplied by a sequence controller CTL as more fully described hereinbelow.

The data storage unit DSU has 12 input terminals and 12 output terminals. The data storage unit DSU includes 12 flipflops or other memory or storage cells. Eleven of the input terminals are connected to output terminals of the 11-bit counter CTR while one terminal is connected to the sign signal terminal DGS of the digital seismic generator DSG. Thus a 12-bit signal is stored. The first bit indicates the sign and the remaining eleven bits represent the count registered by the digital counter CTR in response to a spurt SPT of pulses. Such a 12-bit signal is represented in FIG. 4.

Thus, the analog-to-digital converter ADC operates to convert a seismic wave signal into a 12-bit digital seismic signal having a sign component, or bit, and an 11-bit amplitude component. This 12-bit digital seismic signal is generated in the digital geophone each time it is activated and is stored in parallel in the data storage unit DSU and is held there available for further use at the output DOT of the analog-to-digital converter, as explained hereinafter. Such a 12-bit signal is represented in FIG. 4.

As illustrated in FIG. 4, a sign bit SB of 1 represents a plus signal and the 11-bit signal 00111001101 represents an amplitude of the seismic wave voltage extending from the most significant bit position MSB to the least significant bit position LSB. Such a 12-bit signal is a seismic data signal.

The digital geophone GE includes a shift register SR which serves a dual purpose. First, the shift register SR cooperates with a comparator CPR and an address source or register ADR and an operation code decoder OPDK to detect when an interrogation signal TRS has been received by the geophone GE containing both the operation code and the address of that geophone. Second, the shift register SR is also employed, when suitably actuated by means of a parallel enable signal PES applied to a terminal PET, to transfer a previously stored 12-bit data signal from the data storage unit DSU into the shift register SR in parallel form and to transmit that data signal in serial form through the transfer switch IOTS onto the common cable CCA for transmission to the equipment EQ in the recording vehicle.

The geophones include a number of digital computer components in addition to those which form parts of the analog-to-digital converter. All such components store, respond to, receive and transfer digital signals in the forms of pulses. For convenience various signals are known as 1-signals or TRUE signals while others are known as 0-signals or FALSE signals. In the specific embodiment of the invention described, TRUE signals may be assumed to have positive voltages such as five volts, while FALSE signals may be assumed to be of low or zero voltage. Generally speaking the system makes use of standard components and particularly makes use of NAND "logic" units. Inverters are employed at various points as needed to change a TRUE signal to a FALSE signal or vice versa, as needed to perform logic and triggering operations. In some cases, a combination NAND gate and an inverter are drawn as an AND gate.

The sequence of operations occurring in the digital geophone during operation is represented graphically in FIG. 3.

When an interrogation signal TRS, which includes both the OPCODE and the address of the digital geophone GE, is received at the geophone, two TRUE signals are applied to the input legs, or ports, of an activator AND gate AAG thereby producing an activating trigger pulse ATP at its output. The manner in which these two TRUE signals are generated is explained hereinafter.

The activating trigger pulse ATP is applied to the input of the analog-to-digital converter to initiate the operation of the digital seismic generator DSG and to generate at its output a spurt of pulses and a sign signal that represents the amplitude of the seismic wave voltage being generated at that time by a differential geophone or seismic sensor DIG. At this time, the 12-bit signal is generated that represents a characteristic of the seismic wave being currently received and stored and is thus made available at the output DOT for further processing and use. The 12-bit signal is thus a sample, or at least a representation of a sample, of the seismic wave itself.

At the same time, the activating trigger pulse ATP is applied to a sequence controller CTL which serves to program sequential operation of various parts of the digital geophone in order to transfer the 12-bit data signal which has been stored in the data storage unit DSU, onto the common cable CCA and then to reset the digital geophone in its initial, rest, or quiescent condition where it is ready for reactivation the next time that an interrogation signal TRS carrying the address of that geophone is transmitted to it over the common cable CCA.

The seismic digital generator includes a differential sensor DIG that has two elements such as two windings WW across which two analog voltages are continuously being generated in accordance with a characteristic of the seismic wave being received. The sign and amplitude of this characteristic is sometimes referred to as the sign and amplitude of the seismic wave elsewhere in this specification.

Upon application of the activating pulse ATP to the digital seismic generator DSG, these voltages are applied to a pulse width modulator PWM to generate the burst of pulses at the pulse output DGP and the sign signal at the sign output DGS, which indicate the amplitude and the sign respectively of the seismic wave voltage. Such a pulse width modulator is described in U.S. Pat. No. 3,201,602 issued to R. H. Norwalt and another in U.S. Pat. No. 3,353,117 issued to Donald Renkowitz. Both of these units employ varactors whose characteristics are altered in accordance with the amplitude of the input signal. An example of a pulse width modulator is described more fully hereinafter.

The spurt of pulses SPT appearing at the terminal DGP is illustrated in Graph G7 of FIG. 3. As mentioned, those pulses are counted in the counter CTR. The count is stored in the data storage unit DSU and is represented as 1-signals and 0-signals at eleven of its output terminals DOT. A sign bit of 1 indicates a + signal and a sign bit of 0 indicates a − signal. The sign bit is represented by the 12th output terminal of the data storage unit DSU.

The operation of the sequence controller CTL is initiated by the application of the actuating pulse ATP to its input. The sequence controller CTL is designed to supply a number of signals to the remainder of the digital geophone for controlling operations of the geophone sequentially in a predetermined manner. More particularly, the sequence controller CTL supplies a string SHP of shift pulses, a data transfer signal THS, a parallel-enable signal PES, an I/O transfer switch signal MSWS, and a counter reset signal CRS.

At a time RTM shortly after the binary digital seismic signal (see FIG. 4) has been stored in the data storage unit DSU, a string of shift pulses SHP generated by the sequence controller CTL is applied to the shift terminal ST of the shift register SR. As a result of actions to be described more fully hereinafter such a string STR of shift pulses consists of a string STR1 of 12 pulses, a pause which may be of a duration, say, of 2 shift pulses, and then another string STR2 of 12 pulses. Such a string STR of pulses is indicated in Graph G1 of FIG. 3.

When the first string STR1 of shift pulses is supplied to the shift register SR, the data previously stored therein is shifted out through its right-most output terminal SROT1 through the I/O transfer switch IOTS and onto the common cable CCA. The signal transferred out of the shift register and onto the cable at this time is a duplicate, or echo, of the signal that had previously been received by the digital geophone GE. Thus the signals read out at this time consists of the operation code and the address of that geophone as indicated in the section of Graph G2 directly below the string STR1 of shift pulses. Upon completion of this read-out operation, two pulses are suppressed, or skipped. At this time a parallel enabling signal PES is generated in the sequence controller SQC as indicated in Graph G12. The parallel-enable signal PES is applied to a parallel-enable terminal PET of the shift register SR. At this time, the 12-bit data signal previously stored in the data storage unit DSU is transferred into the 12-bit shift register SR. Shortly thereafter, the supply of shift pulses is resumed so that the second string STR2 of 12 pulses is applied to the shift terminal ST of the shift register SR, as indicated in Graph G1. The application of this second string STR2 of shift pulses shifts the 12-bit data signal out of the terminal SROT1 through the transfer switch onto the common cable CCA.

Thus, during the output phase of operation of the digital geophone, a 26-bit signal is transferred to the common cable CCA. This 26-bit signal consists of four bits representing the operation code followed by eight bits representing the address of the activated geophone. This signal is then followed by two 0 signals, that is, a 0 signal that has a duration corresponding to two pulse intervals, and then a 12-bit seismic data signal.

The sequence controller CTL controls both the inputting of signals into and the outputting of signals from the geophone GE.

The sequence controller CTL employs three univibrators UR, UH, and UU, a sequencing unit SQU, a clock pulse generator CLPG, and various other elements for generating the data transfer signal THS, the master switch signal MSWS, to produce the string of shift pulses SHP, the parallel-enable signal PES, and the counter reset signal CRS in the desired sequence.

The signals produced at the output terminals of the univibrators UR, UH and UU in response to the activating pulse ATP are designated by the symbol Q when the generator pulse is TRUE and by the symbol $\bar{Q}$ when the value of the signal is FALSE.

More particularly, when the activating pulse ATP appears at the output of the activating AND gate AAG, the three univibrators UR, UH, and UU, are triggered into operation. The three univibrators UR, UH, and UU are so designed as to produce control signals at their output terminals in the form of single pulses having durations suitable to generate the output signals MSWS, FHS, THS, and CRS at the desired times. Illustrative examples of time sequences are represented in FIG. 3.

When the activating pulse ATP triggers the counter reset unit UR, a $\bar{Q}$ pulse appears at its output terminal OTR applying a counter reset signal CRS to the reset terminal RT of the counter CTR. The reset signal CRS sets the counter CTR in its 0-count condition thus preparing it to count the pulses in the spurt SPT. The signal Q appearing at the output terminal OTR is of short duration, being completed before pulses are applied to the counter CTR from the output terminal DGP of the pulse width modulator. Such a reset pulse is shown in Graph G4. Actually if the pulse duration is longer, it is immaterial so long as it terminates within 5 μsec that is before the gate SSG is enabled by the output of the exclusive OR gate XOR (See FIG. 7).

When the HOLD unit UH is triggered by the activating pulse ATP, it generates a TRUE signal Q at its TRUE output terminal OTHT and a FALSE output signal $\bar{Q}$ at its FALSE output terminal OTHF. These two signals have durations that exceed the time required for the analog seismic wave signal to be converted to a binary digital signal and to be stored by the analog-to-digital converter ADC as previously described. These signals exist at their TRUE and FALSE levels respectively from the activating time ATM until a return time RTM as indicated by Graphs G9 and G10 of FIG. 3.

The interval between the activating time ATM and the return time RTM is referred to as the HOLD interval.

A FALSE signal FHS is generated and a TRUE signal THS at the output of the HOLD unit during the HOLD interval.

The FALSE output signal FHS generated by the HOLD unit UH is applied to a clock gate CLG to inhibit the flow of clock pulses from the clock pulse generator CLPG to the sequencing unit SQU during the period while the seismic wave voltage is being sampled, converted and stored by the analog-to-digital converter ADC.

The true output signal THS generated by the HOLD unit UH is applied to the strobe terminal HPS of the data storage unit DSU during the HOLD interval. At the end of that interval the negative going edge of the signal strobes the seismic data signal from the counter CTR and the sign signal from the geophone output terminal DGS into the data storage unit DSG.

When the activating pulse ATP triggers the I/O control unit UU, a TRUE signal Q is generated at its output terminal OTU. This signal, called here a master switch signal MSWS, has a duration that exceeds the duration of conversion of the analog-to-digital converter ADC and the duration of the string of shift pulses STR. Such a switch signal is indicated in Graph G8. In other words, the master switch signal MSWS switches the I/O transfer switch IOTS from its inputting state to its outputting state immediately after the interrogate signal TRS is detected and holds the I/O transfer switch IOTS in that condition until after the interrogating signal TRS and the seismic wave data signal have been transferred from the digital geophone GE onto the common cable CCA. For convenience, the period during which the I/O transfer switch IOTS is in its outputting state is called the active interval. It is during this interval that the analog-to-digital conversion and the outputting occur.

At the time ATM that the master switch signal MSWS attains its TRUE state Q, it is applied to the latching terminals G of the three univibrators UR, UH, and UU to disenable the input circuits of these univibrators so as to preclude the possibility of their being triggered again until the outputting operation has been completed. Thus accidental triggering is prevented while the univibrators are disenabled.

When the master switch signal MSWS returns to its rest state at the time PTM, the transfer switch IOTS returns to its inputting state thereby holding the digital sensor in condition ready to be activated again by an interrogation signal in the manner previously described.

As previously indicated, the transmission of pulses from the clock pulse generator CLPG through the clock gate CLG of the sequence controller CTL is inhibited by the FALSE HOLD signal FHS appearing at the FALSE output terminal OTHF of the HOLD unit UH during the HOLD interval. At the end of the HOLD interval, the clock gate CLG is enabled thereby gating clock pulses from the clock pulse generator CLPG into the sequencing unit SQU.

The unit SQU is enabled to operate to perform the required sequencing operation only during the active interval, that is, only while the master switch signal MSWS is applied in its TRUE or Q state to the enabling gate EQG and to the reset terminal RT of the sequence counter SQC.

The sequence unit SQU employs a sequence counter SQC and decoders SQD for purposes more fully described hereinbelow. One of the decoders is employed to apply an enabling signal to the enabling gate EQG in the rest state of the sequence counter and until a count of 26 is decoded. The sequence counting operation is described more fully below.

The sequence counter SQC is a scale-of-32 counter of conventional type. The counter has five memory elements, such as flip-flop units, which are initially set in their 0 condition by transition of the master switch signal MSWS to its Q state. Thus when the activating signal ATP is applied to the I/O control unit UU to trigger it into operation in its TRUE state, the signal appearing at the output terminal OTU is applied to the reset terminal QRT of the sequence counter SQC to enable it to count. Immediately thereafter the enabling signal QES appearing at the output of the enabling gate EQG enables the gate IQG at the input of the sequence counter SQC. As a result, when the flow of pulses from the clock pulse generator CLPG through the gate CLG into the sequencing unit SQU is resumed at the time RTM at the end of the HOLD interval as previously described, pulses flow through the input gate IQG to the triggering terminal TT of the sequence counter SQC. As these pulses flow into the sequence counter SQC they are counted, thus producing at the output terminals OQT, signals that represent the count in binary form. The count is incremented by 1 each time a pulse enters the sequence counter and the current count is represented by signals at the output terminals of the sequence counter SQC. These signals are decoded there by means of a set of decoders SQD as more fully described below, in order to sequence the flow of the two strings STR1 and STR2 of shift signals to the shift register. The sequence counter and one of the decoders also cooperate with a load shift unit UL to apply the parallel enable signal PES to the shift register SR at an appropriate time as previously mentioned and as indicated in Graph G12.

In addition to the enable gate EQG and the inputting gate IQG, the sequencing unit SQU employs a shift pulse gate SPG and a pulse suppression gate PSG.

Figure 9:
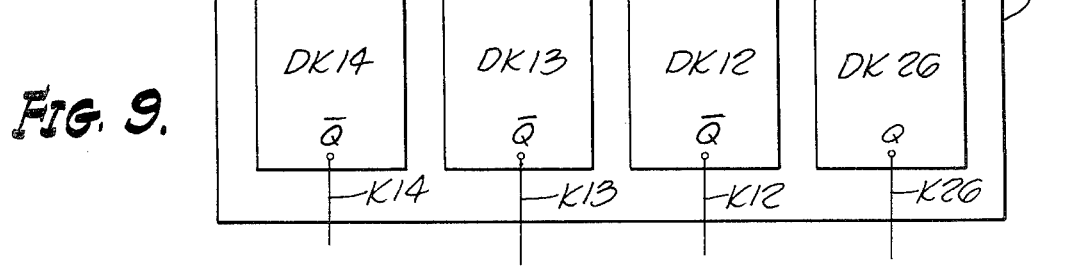
FIG. 9 is a block diagram of a set of decoders.

As indicated in FIG. 9, the set of decoders SQD consists of four decoders DK12, DK13, DK14, and DK26. Each of the decoders produces a FALSE or $\bar{Q}$ signal at its output when the counts K12, K13, and K14 respectively are detected in the output OQT of the sequence counter SQC and the fourth decoder DK26 produces a TRUE or Q signal at its ouput when a count of 26 is detected. Such an arrangement of decoder's is indicated in FIG. 9.

The output of the enabling gate EQG is in its TRUE state whenever the output of the I/O control unit is in its FALSE state, that is, while the transfer switch is in its receiving or inputting state while waiting for an interrogating signal TRS and whenever the output of the decoder DK26 is in its FALSE state.

In its rest condition, the decoder DK26 is in its FALSE or $\overline{Q}$ state so that the input gate IQG is enabled regardless of the signal received from the terminal OTU of the I/O control unit UU. While in this condition the input gate IQG is prepared to transmit pulses to the sequence counter SQC when the FALSE output signal FHS from the HOLD unit UH returns to its TRUE state at time RTM.

While in their rest condition, the decoders DK12, DK13, and DK14 are all in their TRUE state so that the pulse switching gate PSG is in its TRUE state enabling the shift pulse gate SPG.

Thus with the shift pulse gate SPG enabled by the output of the enabling gate EQG and the pulse switch gate PSG when the transfer switch IOTS is in its inputting state, shift pulses flow from the clock pulse generator CLPG to the shift register through the clock gate CLG and through the shift pulse gate SPG at all times, except that such flow is inhibited (1) by the HOLD unit when it is in its HOLD state, that is, during the HOLD interval and (2) by the pulse switch gate PSG when it is in its FALSE state and (3) by the enabling gate EQG when it is in its FALSE state.

Thus the sequencing unit SQU periodically passes through four phases of operation designated as $\phi 1$, $\phi 2$, $\phi 3$, and $\phi 4$ in FIG. 3. It is in the first phase $\phi 1$ while the I/O transfer switch IOTS is in its inputting state and it passes through phases $\phi 2$, $\phi 3$, and $\phi 4$ in turn while the transfer switch is in its outputting phase, that is while the digital sensor is in its active state.

It will be noted that the digital sensor is in phase $\phi 1$ initially and enters phase $\phi 2$ at time ATM and returns to phase $\phi 1$ at time PTM. Please $\phi 2$ exists throughout the HOLD interval. Phase $\phi 3$ exists while the string of shift signals STR are being applied to the shift register. And phase $\phi 4$ exists from a time commencing after the signals have been transferred to the common cable CCA up to the time that the transfer switch is switched from its outputting state to its inputting state.

The operation of the system, especially the sequence controller CTL, is described in phases below.

Phase 1 operation

During the phase 1 interval, FALSE signals are applied to the input of the enabling gate EQG from the I/O HOLD unit and from the decoder DK26. As a result the input gate IQG is enabled. And at the same time, the pulse switching gate PSG is in its TRUE state. Therefore the shift pulse gate SPG is also enabled.

At this same time, a TRUE signal supplied from the $\overline{Q}$ output terminal OTHF of the HOLD unit to the clock gate CLG enables the clock gate CLG so that pulses from the clock pulse generator CLPG are applied in a continuous stream through the shift pulse gate SPG to the shift terminal ST of the shift register SR.

These shift pulses are applied to the shift register continuously until an interrogate signal TRS activates the digital geophone. When an interrogate signal is received, that signal is shifted into the shift register SR. This process continues indefinitely until an interrogate signal TRS is received with the proper address, namely, the address of the digital geophone GE in question. When such a signal is received, an activating signal ATP appears at the output of the activating gate AAG terminating the first phase $\phi 1$ and initiating the second phase $\phi 2$.

Phase 2 operation

As previously explained, when the activating signal ATP is received, the HOLD unit UH is triggered thereby generating a $\overline{Q}$ signal and a Q signal.

Thus a FALSE signal FHS is applied to one input leg of the clock gate CLG inhibiting the flow of clock pulses through the clock pulse gate CLG to the sequencing unit SQU. While the FALSE signal FHS from the HOLD unit UH remains in its 0 condition, the flow of shift pulses to the shift register is cut off as indicated in Graph G1.

The TRUE signal generated by the HOLD unit UH applies a signal THS to the data storage unit DSU. When this signal returns to its FALSE state at time RTM the digital seismic data is strobed into and is stored within the data storage unit DSU.

In this phase $\phi 2$ the burst of pulses SPT is generated in the digital signal generator DSG, and counted in the counter CTR and stored in the data storage unit DSU as described above.

The second phase $\phi 2$ terminates at time RTM and the third phase $\phi 3$ commences then.

Phase 3 operation

When the signal FHS returns automatically to its TRUE state at time RTM the flow of clock pulses from the clock pulse generator CLPG through the clock gate CLG and the shift pulse gate SPG is resumed. At this time, the signal applied to the enabling gate EQG from the I/O control unit is in its TRUE state. However, a signal from the output of the decoder DK26 is in its FALSE state so that the gate EQG maintains the inputting gate IQG enabled, permitting pulses to flow from the clock pulse generator CLPG through the clock gate CLG and through the input gate IQG to the sequence counter SQC. There the pulses are counter incrementally until a TRUE signal appears at the output of the decoder DK26, disabling input gate IQG and terminating the counting operation until the next time the first phase $\phi 1$ is completed.

The first 12 shift pulses, that is, the string STR1 of pulses that are applied to the shift register SR cause the shift register to regenerate the interrogate signal TRS, including both the OPCODE and the address SAD of the geophone and to apply them to the cable CCA.

When the count of 12 is reached, the decoder DK12 is switched to its FALSE condition, triggering the operation of the load/shift until UL and then creating a parallel-enable trigger pulse PES of short duration. As a result the digital seismic data signal is transferred from the storage unit DSU into the shift register SR at this time.

The output of the pulse switch gate PSG remains in its TRUE state throughout the counting operation, except when a count of 13 is detected by the decoder DK13 or a count of 14 is detected by the decoder DK14. At these times, the outputs of the decoders DK13 and DK14 switch to their FALSE states thereby setting the pulse switch gate PSG temporarily to its FALSE state thereby inhibiting the shift pulse gate SPG. The shift pulse gate remains inhibited so long as the sequence counter is indicating either a count of 13 or a count of 14 as the case may be. When the count of 15 is reached, the flow of clock pulses from the clock pulse gate CLPG to the shift register SR is resumed. The occurrence of the counts 13 and 14 are indicated by the blank space between the strings STR1 and STR2 of graph G1 and in graphs G13 and G14 of FIG. 3.

When a count of 26 is reached the state of the decoder DK26 changes to its TRUE state thereby cooperating with the TRUE state of the I/O control unit UU to change the output of the enabling gate EQG to its FALSE state thereby inhibiting the input gate IQG and cutting off the flow of clock pulses CLPG into the sequence counter SQC and terminating the third phase $\phi 3$ and initiating the fourth phase $\phi 4$.

Thus the two strings STR1 and STR2 of pulses consisting of 12 pulses each are supplied to the shift terminal ST of the shift register SR. As a result, the 12-bit interrogate signal and the 12-bit seismic data signal SDS are emitted to the cable CCA during the third phase.

Phase 4 Operation

After the enabling gate EQG has been switched to its FALSE state by the attaining of a count of 26, the inputting gate IQG is inhibited, cutting off the flow of clock pulses from the clock pulse generator CLPG to the sequence counter SQC. At the same time, the enabling gate EQG applies as inhibiting signal to the shift pulse gate SPG cutting off the flow of clock pulses CLPG to the shift register SR.

Thus, the decoder DK26 serves two functions. It suspends the counting operation of the sequence counter SQC as previously mentioned and also suspends the shifting operation of the shift register.

After a short interval of time, the I/O control unit returns to its quiescent state terminating the active interval and switching the I/O transfer switch IOTS from its outputting condition to its signal inputting condition. At the same time the I/O control unit applies a FALSE signal to the input of the enabling gate EQG re-enabling the shift pulse gate SPG so that clock pulses resume their flow through the clock gate CLG and through the shift pulse gate SPG to the shift register SR.

At this same time the flow of pulses from the clock pulse generator CLPG through the input gate IQG is resumed but they are not counted because a FALSE signal is being continuously applied to the reset terminal QRT of the sequence counter from the output of the I/O control unit, until the activating pulse ATP is generated by the activating AND gate AAG. So long as a FALSE signal is thus applied to the reset terminal of the sequence counter SQC, counting of pulses in the sequence counter SQC is inhibited.

As illustrated in FIG. 6, the transfer switch IOTS may be in the form of two gates, an IN gate ING and an OUT gate OTG.

A connector terminal CT is provided to connect the transfer switch IOTS to the branch cable BCA. The output terminal of the output gate OTG is connected to this connector terminal. So also is one input leg of the IN gate ING. The output terminal of the input gate ING is connected to an inputting terminal INT for feeding signals from the common cable CCA to the input terminal T of the shift register SR. The outputting terminal OPT is connected to one of the legs of the outputting gate OTG for receiving signals from the output terminal SROT1 of the shift register SR. The remaining leg of output gate OTG is connected to a control terminal COT directly. The remaining input leg of the inutting gate ING is connected through an inverter to the control terminal COT. The master switch signal MSWS which is generated at the output of the I/O control unit UU is applied to the control terminal COT so that the inputting gate ING is enabled while the master switch signal MSWS is in its FALSE state and the outputting gate OTG is enabled while the master switch signal MSWS is in its TRUE state. Thus the transfer switch IOTS is in condition to transfer signals from the common cable CCA into the shift register while the master switch signal MSWS is in its FALSE state and is in condition to transfer signals out of the shift register SR while the master switch signal MSWS is in its TRUE state, as previously described.

Figure 8:
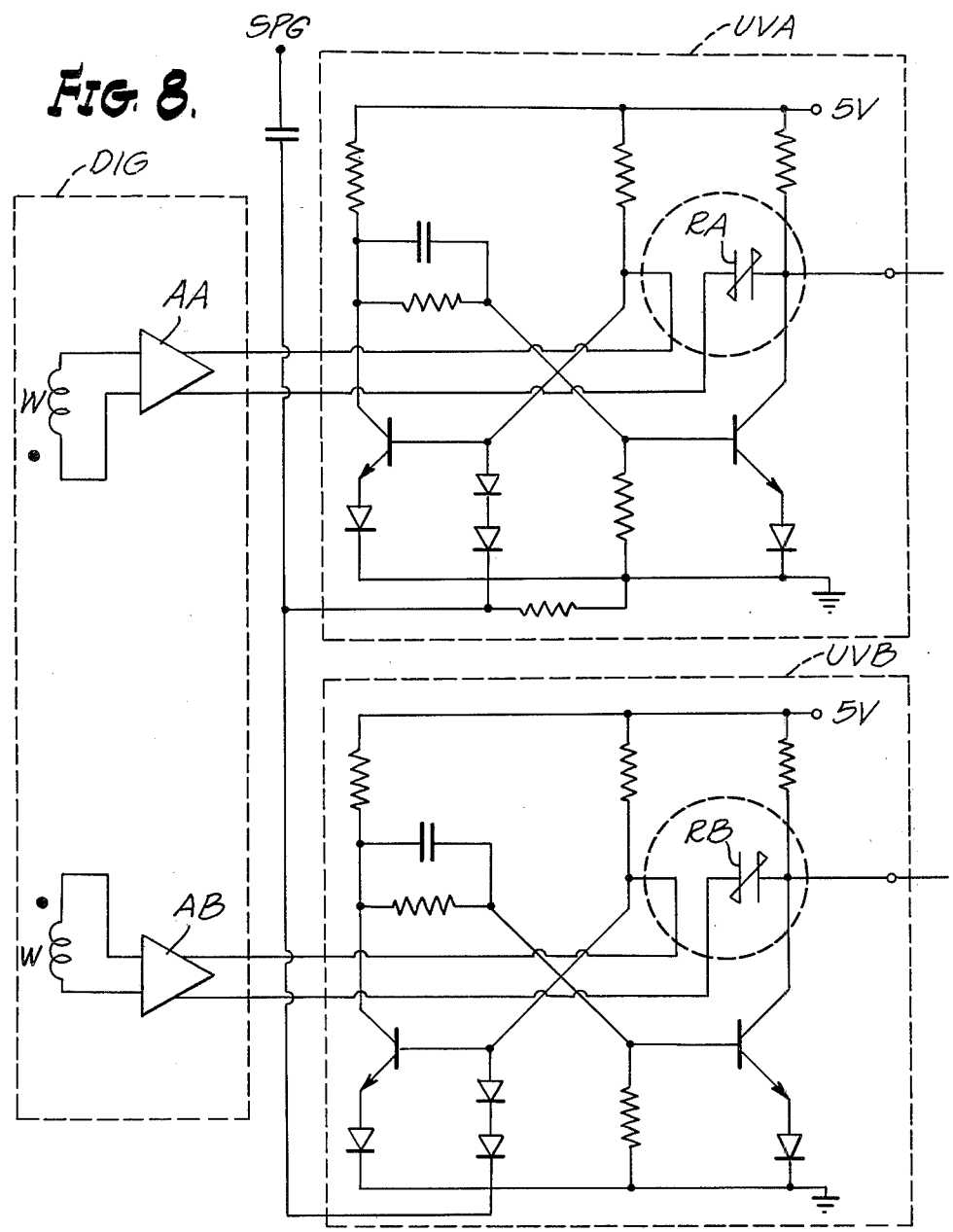
FIG. 8 is a schematic diagram of a geophone sensor and pulse width modulator employed in the invention.

A pulse width modulator PWM illustrated in FIGS. 2, 7 and 8, comprises a pair of univibrators UVA and UVB for receiving seismic voltages through amplifiers AA and AB from two windings W, W of a differential geophone DIG. Wiring diagrams of a pair of multivibrators suitable for this purpose are illustrated in FIG. 8. The voltages from the geophone are applied to the univibrators UVA and UVB to cause the univibrators to generate pulses of different durations depending upon the amplitude of the incoming seismic wave. In effect, voltages of opposite polarity are applied to the univibrators UVA and UVB. Initially, with no voltage applied, the univibrators are substantially matched to generate pulses of nearly the same, or reference, duration. A voltage of one sign causes an increase in the duration of the pulse generated by one univibrator and a voltage of the other sign causes a decrease in the duration of the pulse generated by the other univibrator. Such pulses PA and PB are shown in FIG. 7 and as Graphs G5 and G6 of FIG. 3. Thus the voltages from the two windings W of the differential geophone DIG causes the pulses to change in duration in opposite directions from the reference duration.

As shown in FIG. 7, the two univibrators produce pulses having durations that depend upon the voltage currently being produced by the seismic signal. As indicated by the dotted line DL of FIG. 3, the pulses generated by the two univibrators are of substantially equal duration when the applied voltage is 0 and one increases in duration and the other decreases in duration in accordance with the amplitude of the applied voltage. When the sign of the voltage is reversed, the role of the two univibrators is interchanged. Thus the sign of the signal represented by the pulse burst SPT depends upon whether the pulse generated by univibrator UVA or the pulse generated by univibrator UVB is the longer of the two.

As indicated in FIG. 7 the output pulses PA and PB from the two univibrators UVA and UVB are applied to the input legs of an exclusive OR gate XOR. Such gates are well known. A TRUE signal appears at the output of the exclusive OR gate XOR only when the two signals applied to its input legs are different. Consequently, a TRUE signal PD appears at the output of gate XOR only during the interval when one and only one of the pulses PA and PB is in a TRUE state, that is while the outut of one multivibrator is TRUE and the output of the other is FALSE.

A seismic signal gate SSG is employed to gate clock pulses from the clock pulse source SCPG when only one pulse PA or PB exists. This gate SSG has two input legs, one connected to a seismic clock pulse generator SCPG and the other to the output of the exclusive OR gate XOR. With this arrangement, clock pulse signals appear at the digital pulse terminal DGP only while the two voltages generated at the outputs of the univibrators UVA and UVB are different, thus resulting in a burst SPT of seismic pulses at the output terminal DGP that includes a number of pulses proportional to the difference in duration between the two pulses PA and PB.

A JK flip-flop unit FFU is employed to indicate which of the pulses PA or PB is of longer duration thus indicating the sign of the seismic wave signal. The flip-flop unit FFU has two data input terminals JT and KT which are connected to the outputs of the univibrators UVA and UVB and also a clocking terminal PT which is connected to the output of the exclusive OR gate XOR.

As explained hereinabove, the pulse width modulator PWM is triggered by the activation pulse ATP to produce the digital pulse signal at the output of the pulse width modulator, whenever an interrogate signal TRS is received bearing the address of the geophone GE. The time constants of the univibrators are short, being of the order of 30 $\mu$sec at the 0 voltage point DL (See FIG. 3) and varying by up to about $\pm 25$ $\mu$sec in response to applied seismic voltages, so that the pulse width modulator PWM, in effect, makes substantially instantaneous conversion of the seismic wave signal into the burst of pulses SPT. One such burst SPT is generated each time the geophone GE is activated by an interrogation signal TRS.

When the activation pulse ATP is applied to the trigger terminal SPG of the pulse width modulator, the two univibrators UVA and UVB are triggered, initiating the generation of their respective pulses. When the burst of pulses SPT appears at the output terminal DGP, it is fed to the 11-bit counter CTR. The sign signal that appears at the terminal DGS remains there for the duration of the differential pulse PD. Both the sign signal and the binary count signal developed at the output of the counter are applied to the data storage unit DSU as previously explained when the data transfer signal THS is generated by the HOLD unit at time RTM.

The counter CTR may be made of three 4-bit digital subsystems manufactured by Signetics Corporation of Sunnyvale, California, and designated by the Ser. No. 8281. The three 8281 units are interconnected in a conventional manner for this purpose. But in this case the terminal corresponding to the most significant bit remains unused thus forming an 11-bit counter. The data storage unit DSU may also be made of three such subsystems of the same serial number.

Voltages from the separate sides of the digital geophone DIG are applied to the univibrators in such a way as to alter the durations of the pulse generated thereby. To this end, as indicated in FIG. 8, each of the seismic wave voltages may be applied through amplifiers AA and AB to one of the cross-over connections between the collector of one of the transistors and the base of the other. Varactors RA and RB, that is, diodes that have capacity values that change as a function of the voltage applied, may also be connected in that circuit to affect the duration of the pulse generated.

The amplifiers AA and AB serve not only to amplify the signal applied to the univibrators UVA and UVB, but also to isolate the voltage generating elements of the geophone sensors from direct inclusion in the current discharge paths of the univibrators UVA and UVB. The amplifiers may include digital gain control means to extend the range of the device and the binary digital signals representing the gain settings may be added to the 26-bit string of signals that is transmitted to the recording truck RCT.

The differential geophone may be in the form of two matched geophones with their cases connected together rigidly. Or it may be in the form of two windings spaced apart on the same resiliently suspended inertial member with the two windings movably arranged in the air gaps of two separate but rigidly connected matched magnets.

Preferably, the inductive coupling between the two windings is small so that the two sides of the geophone may act substantially identically but out of phase.

Though the differential geophone DIG is shown with two coils for generating the seismic wave voltages, it may be in other forms, such as a geophone including two piezoelectric crystals.

The digital seismic signal or count stored by the counter, including the sign signal are applied to the input terminals of the 12-bit data storage unit DSU where the signals are stored in 12 memory elements ready for transferring, when required, to the shift register SR.

The address register ADR may be of a simple type such as that shown in FIG. 5. As there shown, the address register has eight terminals AT1, . . . AT8 at which a binary signal unique to the geophone GE appears as a set of TRUE and FALSE signals corresponding to the different bits of the address in binary notation. These signals are set at the TRUE or high voltage level values or at the FALSE or 0 voltage level by setting of the toggle switches TOS. The connections may be permanently set with wiring instead of with switches.

The comparator CPR is of a conventional type which compares two 8-bit binary signals and produces a TRUE signal at its output only when the two binary signals are identical.

The sequence counter SQC is of a conventional type capable of counting the number of pulses in a string of pulses. The pulses to be counted are applied to the trigger terminal TT. The state of the various memory elements within such a sequence counter can be reset to and held in their 0 state at any time by applying a 0 voltage or FALSE signal to a reset terminal QRT.

The decoders are of a conventional type. Each decoder is provided with five input terminals and a single output terminal to enable the decoder to produce a FALSE or 0 signal or a TRUE or 1 signal as indicated in FIGS. 9 and as previously described as its output, only when the digital signal represented by the voltages applied to its five input terminals corresponds to the binary representation of the count to be detected.

All of the circuitry and the power supply or batteries needed for energization of the circuitry illustrated in FIG. 2, except the cables BCA and CCA may be enclosed within a common case or housing at the geophone station. To this end, the various components are manufactured in accordance with MSI/LSI technology and the power supplies required to energize the various components are in the form of a lightweight battery located in the geophone. A number of differential geophone sensors may be located in a cluster and connected together in series or parallel as is conventional to improve the accuracy, sensitivity and signal-to-noise ratio of the system.

The sequencing clock pulse generator CLPG operates at a high frequency, such as 400 KHz or higher while the seismic clock pulse generator SCPG operates at a still higher frequency, such as 20 MHz and 40 MHz. When frequencies greater than 400 KHz are used a greater number of geophone stations can be multiplexed in a given sampling time. When frequencies higher than 40 MHz are used, a greater number of pulses are available at the output of the digital seismic generator, thus improving the accuracy of digitizing.

A representative time scale that applies when employing clocks of the frequencies mentioned is indicated in FIG. 3.

Figure 10:
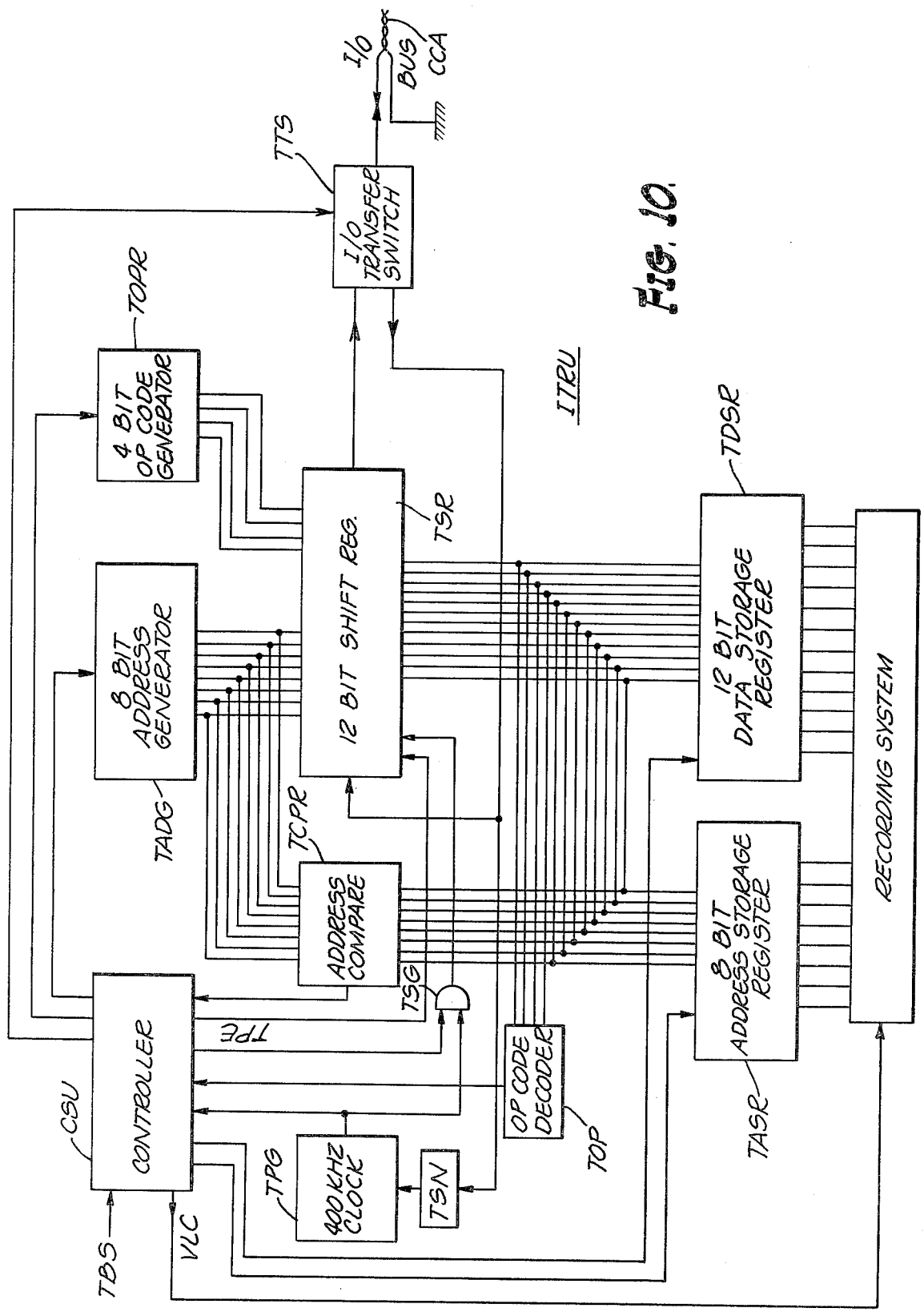
FIG. 10 is a block diagram of equipment employed in the recording truck.
Figure 11:
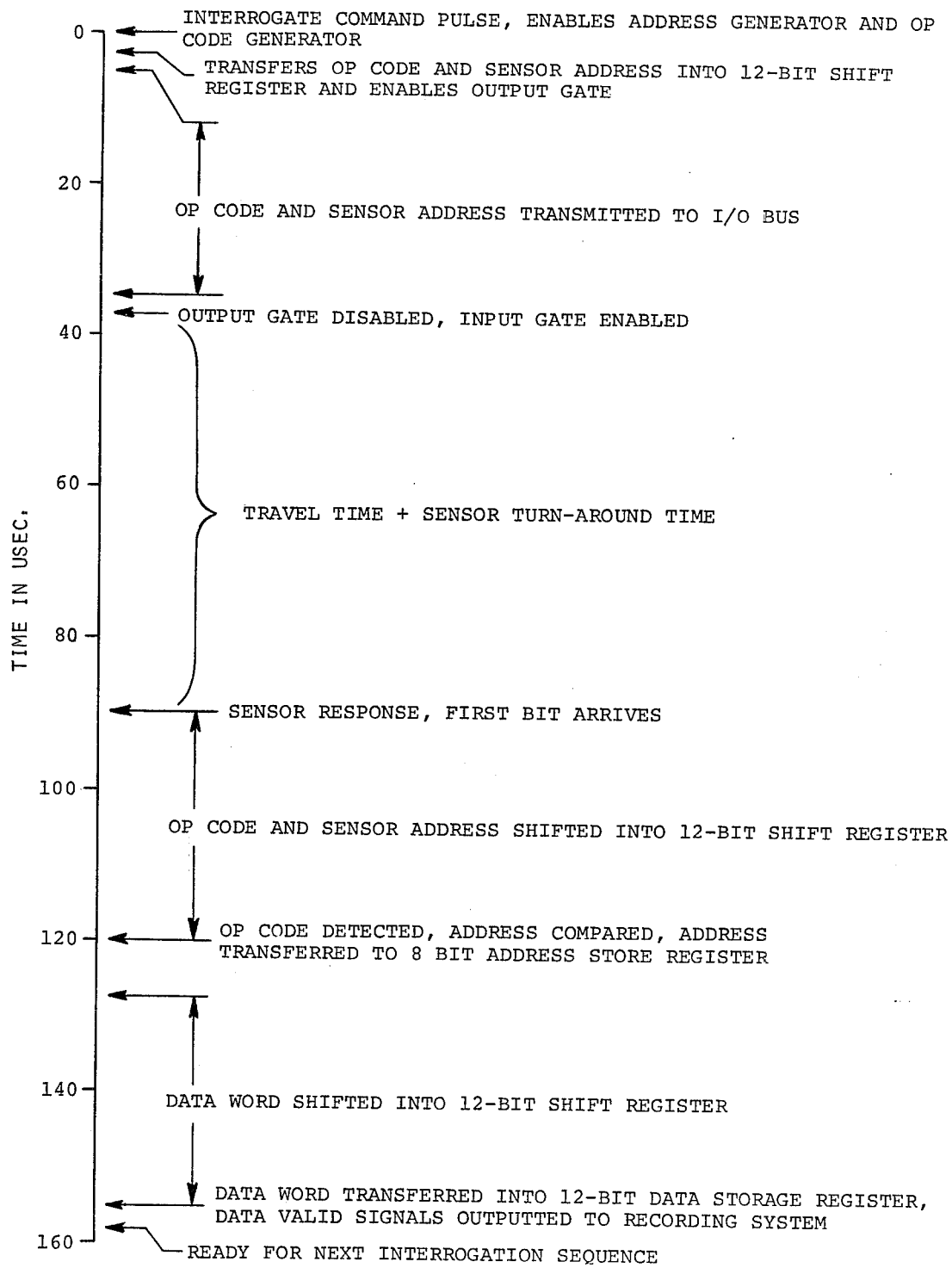
FIG. 11 is a timing diagram employed to explain sequencing of operations in the recording truck.

Equipment EQ of the type that is installed in the recording truck is generally shown in FIG. 10. In effect, this equipment constitutes an interrogator and receiver unit ITRU. In many respects, as will be seen, the unit ITRU is very similar to the equipment in the individual geophones. However, there are some differences. A timing diagram representing the sequencing of events in the truck equipment EQ is shown in FIG. 11.

An Interrogate unit ITRU is actuated by a timebreak signal TBS to cause it to periodically interrogate the geophones in the spread SPR and to receive digital seismic signals from the geophones in the spread in multiplexed form together with the signatures, that is addresses, of the respective geophones and to supply the binary digital signals returned by the geophone to a recording system where the returned signals are recorded on a continuously moving magnetic tape.

The equipment EQ includes a control unit CSU which is actuated each time a train of seismic wave signals is to be initiated at the shooting truck ST (See FIG. 1). More particularly the operation of the equipment EQ is initiated by a time-break signal TBS of the kind that is created when the train of seismic wave signals is initiated. Systems for creating such a signal are well known and are in common use. Such a time break signal TBS may be in the form of a starting signal generated by the master control unit MCU in the recording truck RCT at a time when a train of seismic waves is to be generated and recorded. Such a signal may be transmitted by radio, as is common, to the shooting truck ST to initiate the generation of the seismic wave train. At the same time it may be applied directly to the equipment EQ as indicated in FIG. 10 in order to initiate the operation of the controller CSU to produce cyclical operation of the interrogator-receiver unit ITRU at a predetermined sampling interval.

When the interrogator-receiver unit ITRU is triggered by the time-break signal TBS, it periodically generates and transmits an interrogate signal TRS to interrogate one geophone GE at a time in the geophone receiver spread SPR and to receive returned signals and to supply them to a recorder such as a magnetic tape recorder. The recording may be in a standard SEG format or the recording may include a recording of the 8-bit address signal and the 12-bit data word signal that is returned from each geophone whenever it is interrogated. Any other related signals such as signal representing the settings of the binary gain amplifiers AA and AB in the geophone may also be returned and recorded in a related manner. The latter signals may for example be transmitted over a separate pair of conductors.

The interrogate-receiver unit ITRU includes an I/O transfer switch TTS like those in each of the geophones. The control unit includes a clock-controlled toggle switch unit designed to maintain the transfer switch TTS normally in its receiving or inputting condition so that the interrogate transfer unit ITRU is normally ready to receive signals from a geophone, except during the interval when an interrogating signal TRS is being transmitted, that is outputted, from the equipment EQ to the spread of geophones.

Like geophones, the interrogator-receiver unit ITRU includes a clock pulse generator TPG that generates pulses at a rate close to 400 KHz. Like each of the geophones, the interrogator-receiver unit ITRU also includes a 12-bit shift register TSR for transmitting strings of signals to and receiving strings of signals from the common cable CCA.

An address generator TADG is controlled by the clock pulse generator TPG through the controller CSU to generate a geophone address and to store it in eight memory elements of the shift registers TSR. An operation code generator TOPR also controlled by the controller CSU stores the 4-bit operation code. At appropriate intervals, the controller CSU applies a parallel enable signal TPE to the shift register TSR and gates a string of 12 pulses from the clock pulse generator TPG to apply an interrogate signal TRS to the I/O bus or common cable CCA. The interrogate signal TRS is formed by shifting the 12 pulse signal formed by the 4-bit operation code and the 8-bit address signal out of the shift register TSR. Thus the control unit CSU is arranged to intermittently store the operation code and an address in the shift register and to apply them in serial form to the common cable CCA at intervals sufficiently far apart to permit receiving signals returned from each addressed geophone before another geophone is addressed, and sufficiently close together so that all of the geophones in the spread are addressed one at a time at the predetermined sampling frequency. In this way seismic wave signals received at the respective geophones are sampled at that frequency and returned to the recording truck RCT for recording and further processing. When the control unit switches the transfer switch TTS to its signal receiving state, it also enables the gate TSG to feed clock pulses from the clock pulse generator TPG to the shift register TSR. It will be recalled that the returning signal is a 26-bit signal that includes two 12-bit strings of signals separated by two pauses corresponding to two pulse intervals. When a 26-bit signal is returned to the truck from one of the geophones it is fed into the 12-bit shift register in two 12-bit strings one at a time.

Each time the first 12-bit string, including a geophone address and the operation code is stored in the shift register TSR, the operation code is decoded in the operation code decoder TOP.. When this occurs, the decoder issues a signal to the control unit CSU. At the same time the returned address is compared, in the address comparator TCPR, with the transmitted address, which is still stored in the address generator TADG. If the addresses are the same the comparator TCPR issues a signal to the controller CSU which in turn issues a parallel enable signal to the address storage register TASR to store the address.

The controller CSU continues to enable the gate TSG, being designed to issue 14 pulses to the shift register. When the last of these 14 pulses enters the shift register, the 12-bit data signal from the addressed geophone has been stored in the 12-bit register TSR. At this time the gate TSG is inhibited by the control unit CSU cutting off the flow of pulses from the clock pulse generator TPG to the shift register TSR. The controller CSU immediately issues a parallel enable signal to the 12-bit data storage register DSR causing the 12-bit data signal to be stored there. When the last pulse of the data string has been counted in the controller CSU, a control signal is generated in the controller. This control signal increments the address stored in the address generator TADG by 1 and causes a new 12-bit interrogate signal TRS to be generated and applied to the cable CCA as previously described.

The control signal and a signal issued by the address comparator, actuate a gate in the controller CSU to issue a validity signal VLC to actuate the parallel recording heads of a recording system and to transfer to that system the contents of the storage register if the returned address is the same as the interrogating address. The controller CSU includes a delay unit that causes this transfer and recording action to occur one pulse interval after the data signal has been detected and in any event, long before the return of the next 26-bit signal from a geophone.

Again the transfer switch TTS remains in its transmission state just slightly more than long enough to transmit the new 12-bit interrogating signal ITS onto the common cable CCA. Immediately thereupon the control unit CTL returns the transfer switch TTS to its signal receiving state ready to receive a signal from the most recently interrogated geophone when such signal is returned.

This process of sequential interrogation of the geophones continues until all geophones in the spread SPR have been interrogated and the entire sequence is repeated over and over at appropriate sampling intervals for an indefinite period of time, such as a total of 4 seconds or 8 seconds or even more in order to receive and record multiplexed signals from the geophone spread repeatedly at regular sampling intervals of say 4 ms. throughout that period. The entire process is repeated for successive setups employing different combinations of shot points and spreads in a conventional manner in order to make a seismic survey in an area under investigation. Means for providing detailed circuitry for attaining the desired timing specified are readily provided by those skilled in the art, in view of the foregoing explanation.

In order to facilitate synchronous operation of the equipment on the truck and the equipment in the respective geophones, synchronizers TSN and SNC are employed for causing the clock pulse generators CLPG in the geophones and TPG in the truck to operate synchronously with incoming signals in either of them. Such clock pulse generators and synchronizers suitable for this purpose are well known. Thus, in each geophone a synchronizer SNC is employed which responds to incoming pulses from terminal INT to cause the clock pulse generator CLPG to issue pulses to the gate CLG synchronously with the receipt of the pulses of the interrogate signal TRS by the geophone GE from the common cable CCA. As will be apparent by reference to FIG. 3, such synchronization is needed only during the first phase $\phi 1$ of operation.

The clock pulse generators CLPG in the various geophones are all synchronized simultaneously with the arrival of the first pulse of each interrogation signal at the respective geophones while the geophones are in their inputting conditions. It is to be observed, of course, that the synchronization takes into account that the clock pulse generators CLPG at the various geophone stations are not absolutely synchronized but they are synchronized relative to the times of arrival of pulses at the respective geophone stations over the common cable CCA.

In a similar manner pulses being received at the truck are fed through the I/O unit TTS to a synchronizer TSN that synchronizes the clock pulse generator TPG with the incoming pulses from the cable CCA. This synchronization is initiated by the first pulse of the signal TSP returning from the interrogated geophone.

The clock pulse generator TPG is thus repeatedly synchronized at short intervals of time corresponding to only a fraction of a sampling interval.

The invention has been described above with reference to a differential geophone DIG that generates a series of amplitude bits and a sign bit which together indicate the signed amplitude of the output voltage generated by geophone. The bit pulses are then counted and the count is represented in binary form. As previously indicated, the invention is also applicable to an arrangement in which some other characteristic of the seismic signal is detected. Thus, it will be understood that the digitizing may be applied not only to a signal that is proportional to the amplitude of vibration of earth or to the velocity or to the acceleration, but to any other function of the earth's motion. In the forms of the invention described above, in effect, the amplitude of the differential voltage generated by the geophone is digitized and the seismic wave is said to be digitized. The seismic wave may also be digitized by digitizing the phase.

The invention may also be applied to digitizing the difference in phase of the signals generated by the two elements of the differential geophone. For brevity, this is sometimes referred to as digitizing of the phase of the detected seismic wave. In an embodiment of the invention about to be described, the phase is digitized by detecting the zero-crossing points of the voltages appearing at the outputs of the two geophone elements, and noting which of the geophones crosses first in a pair of crossings. The slope of the wave at the crossing point is indicated by the crossing sequence.

In the particular system for digitizing the phase described herein, a differential geophone of the type heretofore described, is employed for this purpose and the relative times of occurrence of certain zero-crossing points of the signals produced by the two units of the differential geophone, is employed to generate the digitized phase signal. Furthermore, as will become apparent, the zero-crossing points of the two geophone components occur at intervals that vary from one part of the seismic wave to the other. A clock pulse generator is gated for a time equal to that interval so as to generate a short string of pulses which are counted to produce a binary digital signal that is representative of the phase difference between the two differential signals.

An advantage of digitizing the seismic wave by digitizing the phase and transmitting the digitized phase signal to the recording truck in place of the digitized amplitude signal lies in the fact that the number of bits required to represent the phase to produce useful records for analysis is smaller than that required to represent the amplitude. More particularly, records of phase signals of fewer bits, such as 3 to 5, can be analyzed by customary deconvolving processes to produce profiles and maps that represent subsurface formations, than if digitized amplitude signals are employed.

Figure 12:
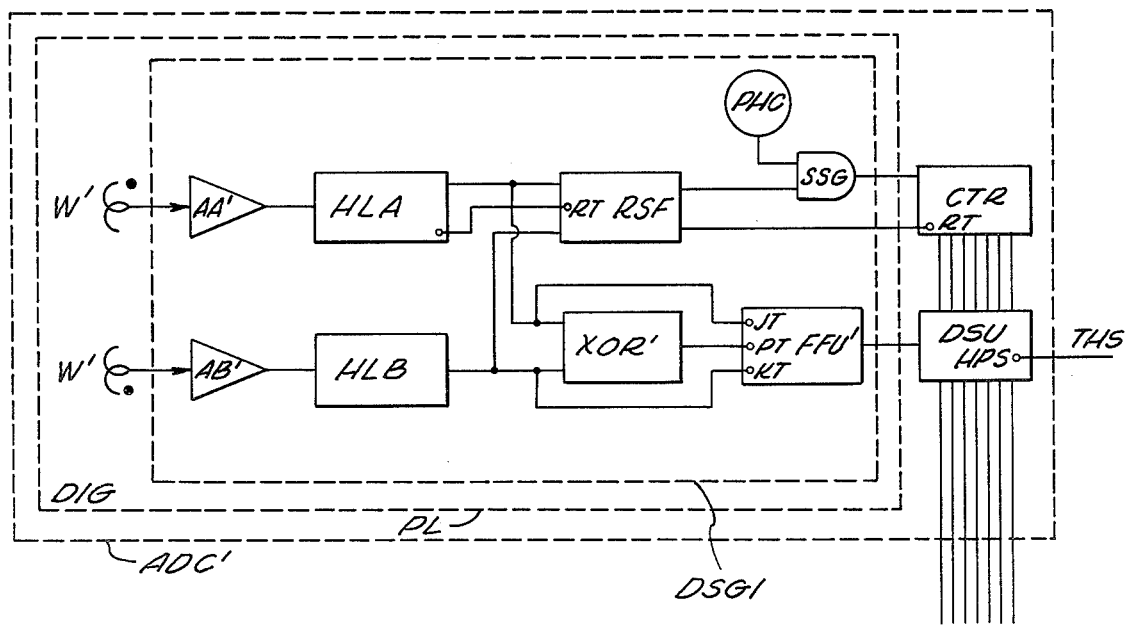
FIG. 12 is a schematic diagram of an alternative form of seismic wave digitizer.

In FIG. 12, there is illustrated an analog-to-digital converter ADC' that employs a digital seismic signal generator DSG' in the form of a phase digitizer. In this embodiment of the invention, the generator unit DSG' is employed in the digital converter ADC' and this converter is employed in place of the converter ADC (see FIG. 2) of the system heretofore described above. The system as a whole operates substantially the same as that heretofore described above if the phase is represented by a 12-bit binary number, including a sign bit, but is modified as needed, in accordance with principles well known to those skilled in the art, in case a binary signal having fewer bits is employed.

The digital seismic signal generator DSG' includes a differential geophone DIG' that comprises two windings W' connected to high-gain amplifiers AA' and AB', the outputs of which are fed to two hard-limiting amplifiers HLA' and HLB' respectively. Examples of such hard-limiting amplifiers, or pulse shapers, will be found, for instance, at pages 120 and 121 of "101 Analog IC Designs" published by Interdesign Inc., Sunnyvale, California. For example, Design 99 "Zero-Crossing Detector" and Design 100 "Precision Zero-Crossing Detector" are suitable.

As a result of the hard-limiting, the fluctuating voltage signal SA appearing across one of the windings W', produces a square-wave signal SQA of variable frequency or pulse width. Likewise, as a result of the hard-limiting, the fluctuating voltage signal SB appearing across the other one of the windings W', produces a square-wave signal SQB of variable frequency or pulse width. As a result, each time the counter CTR is cleared, a small number of clock pulses are fed to the counter CTR in a number proportional to the time interval TI that the signal Q at the QT terminal of the RS flip-flop remains positive, and the number that has previously been latched, or stored temporarily, in the data storage unit DSU remains latched until the next clearing of the counter CTR occurs.

The outputs of the two hard-limiting amplifiers are supplied to the two inputs legs of an exclusive-OR gate XOR', the output of which together with the outputs of the hard-limiting amplifiers, operate a dual J-K edge-triggered flip-flop unit FFU to produce a sign bit that is fed to the data storage unit DSU of FIG. 1. This sign bit indicates which of the hard-limiting amplifiers last remained in a non-zero state while the other returned to a zero state.

The signals appearing at the output of the hard-limiting amplifiers HLA and HLB, are also applied to an RS flip-flop or latch RS which produces a $\overline{Q}$ signal for gating pulses from a clock pulse source PHC to the counter CTR for a time interval commencing when the Q signal next becomes TRUE and the time that the counter is next reset by the $\overline{Q}$ signal.

The pulse rate of the clock pulse generator PHC is established in relation to the scale of the counter CTR so that the capacity of the counter will rarely overflow, or be exceeded, during the operation of the unit. Provisions may be made, to set a flag, if overflow occurs, in a conventional manner. Thus, for example, if the duration of a positive lobe of a signal appearing at the output of the upper winding W' rarely exceeds 8 milliseconds and a 12-bit counter is employed, a clock pulse rate of 4 KHz for clock PHC is satisfactory. This would be the case, for example, if a chirp signal is employed to generate the seismic signals from a high frequency of 125 Hz to a low frequency of 5 Hz.

Figure 13:
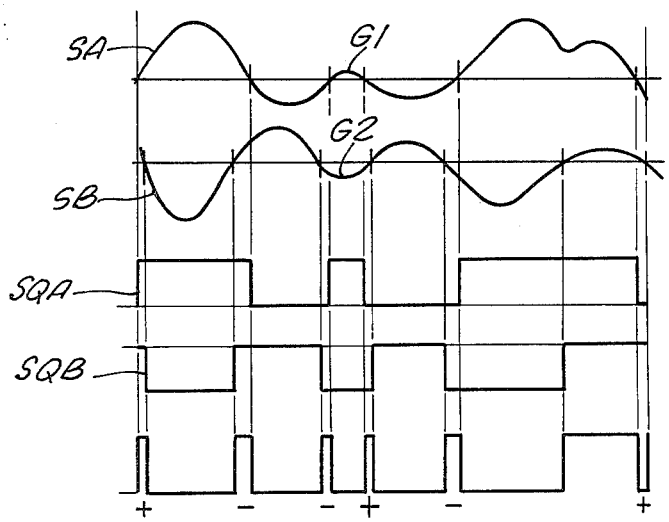
FIG. 13 is a series of graphs employed in connection with the explanation of the operation of the latter seismic wave digitizer.

In FIG. 13, there are shown two graphs GA and GB which represent the voltage signals appearing at the outputs of the windings W'. Each of these graphs has an amplitude which varies as a function of time on opposite sides of a zero base or line. These two graphs are of nearly the same shape. But they are oppositely poled to correspond to the opposite polarities of the two windings W'. It is to be noted that each of the signals represented by graphs GA and GB, cross the zero axis at somewhat irregular intervals. The crossing times are referred to sometimes as zero-crossing points.

The signals SA and SB appearing at the outputs of the two windings W' reach zero values at different times. The time interval TI between adjacent crossings of the two voltages is positive if the signal SA crosses the zero axis prior to the time that the signal SB crosses the zero axis, and is negative if the order of crossing is the opposite, during the same sampling period.

The time interval TI often exceeds the sampling interval, that is, the time elapsed between successive times at which the geophone is addressed from the recording truck RCT. The entire system operates to transfer signals from each geophone to the recorder at intervals which are generally short compared with the intervals TI.

There are many ways that delays can occur between zero-crossings of the outputs of the two windings W'. By way of example, consider a geophone of the electromagnetic velocity-responsive type having two windings, each of which is resiliently mounted with respect to the poles of a permanent magnet. When the geophone moves in response to the reception of seismic waves, the casing carrying the permanent magnet moves relative to the two windings, generating voltages across their ends. In such a case, the delay between one zero-crossing and the other may arise because of the difference in the electrical response characteristics of the circuits that include the two windings. On the other hand, the two windings may actually be in two different geophones which are mounted in the ground close to each other at the same geophone station. In this case, differences in time of crossing may occur primarily because of differences in the coupling factors of the geophones to the two portions of the earth that they contact. The delay also may result from a combination of the coupling factors of the geophones to the earth and the electrical response characteristics of the circuits that include the windings. Though such differences may be small, they are sufficient to produce time delays that vary as a function of time during reception of the seismic waves.

When the signals from the two windings are identical, the output of the exclusive-OR gate XOR' has a ZERO, or FALSE, value, inhibiting the J-K flip-flop unit FFU, thus preventing it from operating in its race mode. A suitable flip-flop unit is one known by the type number 74110, and illustrated at pages 120–122 of *TTL Data Book For Design Engineers* (Texas Instruments, 1973). But when the two signals are different, that is, when the output of one winding is high and the output of the other is low, the output of the exclusive-OR gate XOR' has a ONE, or TRUE, value and the flip-flop toggles, thus producing a ONE, or TRUE, value or else a ZERO, or FALSE, value at the output terminal QT, depending upon whether the output of the hard-limiting amplifier HLA is high or low respectively. The signs of the signals at the outputs of the two high-gain amplifiers are generally opposite to each other and are actually opposite when there is no phase difference between them. But when they are out of phase, they may have the same sign for short intervals because their zero-crossings occur at different times.

In this form of the invention, the output of the activating AND-gate AAG is not connected to the digital seismic generator DSG, so that the digital seismic generator DSG is not controlled by the activating pulse ATP. Likewise, the output of the counter reset unit is not connected to the counter CTR, so that in fact the counter reset unit need not be employed.

In this form of the invention each time the signal $\overline{Q}$ becomes TRUE, the counter CTR is cleared. At this time, the count previously stored therein is transferred to the data storage unit DSU. In addition, the pulses in the next train of pulses that pass through the gate SSG are counted. And whenever the data storage unit DSU is strobed by the hold unit UH at time RTM (see Graph G10 in FIG. 3), the signal RTM from the stored binary signal is transferred in parallel to the shift register SR and thence serially to the cable CCA along with the address of the geophone GE, as described above.

Some further advantages may be achieved in this form of the invention by employing high-gain amplifiers AA' and AB' of the current injection type and supplying these amplifiers with signals from corresponding pulse width modulators. In this case, random fluctuations occur in the zero-crossing times. The advantages of employing this auxiliary feature are well known, being set forth, for example, in an article by G. G. Furman titled, "Improving the Quantization of Random Signals by Dithering", in a memorandum bearing the designation RM-3504-PR and published by the Rand Corporation in May 1963, and in another article by Furman titled, "Removing the Noise From The Quantization Process by Dithering: Linearization", Memorandum RM-3271-PR published by the Rand Corporation in February 1963, and in another article by R. W. Kelly and P. R. Hariharan, titled, "Ideal Limiting of Periodic Signals in Random Noise", published in the *Transactions of the Aeronautical Engineering Society*, Vol. VII, July 1931, published by the Institute of Electrical and Electronic Engineers.

As mentioned above, it is possible to record digitized phase signals having fewer bits than 12. Thus, for example, useful results may be obtained by employing a digitized signal that has a sign bit and 5 phase bits for the data signal SDS (see Graph G-2, FIG. 3). The advantage of using fewer bits in the seismic data signals SDS is that it then becomes possible to transmit signals on the cable at a lower pulse rate than otherwise. The importance of this can be realized from the fact that signals transmitted at a 10 MHz pulse rate can be transmitted on a cable with a given degree of signal quality up to a distance of 2,000 feet, whereas signals of the same quality can be transmitted at a rate of 6 MHz up to a distance of 4,000 feet.

If the number of bits employed for representing the phase is lower than 12, such as 5, then the decoders DK12, DK13, DK14, and DK26 are constructed to detect counts of 6, 7, 8, and 20 respectively, instead of 12, 13, 14, and 26. The methods for designing the decoders to detect particular counts are well known in the art and are therefore not described here.

It will be readily understood by those skilled in the art that there are many ways of implementing the invention described above. In this connection it will be understood that various types of gating circuits and memory elements may be employed to provide the various units needed to carry out the invention. More particularly the details of various units employed may be readily constructed by taking into account the requirements set forth in the timing diagrams of FIGS. 3 and 11 in accordance with principles well known to those skilled in the art.

It is to be noted that in the specific embodiment of the invention described, signals are transmitted over the common cable in bit streams, these streams being subdivided into bursts or strings of bits that carry different kinds of information. It will be understood, however, that if need requires, the binary digital signals in these various streams may be transmitted in parallel over a larger number of conductors or in other ways in order to increase the number of geophone stations in the spread that may be interrogated during a specified sampling interval.

It is thus seen that this invention makes it possible to selectively interrogate the geophones at any one of a number of geophone stations forming a spread and to cause transmission of seismic digital signals from those stations together with the respective addresses of those stations to the point of interrogation. All this can be done without the need for employing separate conductors for the respective geophone stations, while still preserving the identity of the geophone stations from which the respective digital seismic signals have been received.

I claim:

1. In a seismic prospecting system in which seismic waves are received at a plurality of geophone stations, digitized, and recorded in digital form on a magnetic recording medium by a recording device at a recording station, the combination therein that comprises:

geophones located at such geophone stations, a digital register associated with each geophone station and having stored therein a digital address signal that represents an address that uniquely identifies each respective station, converter means at each geophone station for converting a seismic wave received there into an electrical seismic digital signal, a signal switching unit at each geophone station, communication means providing communication between said geophones and said recording device, activating means including means for generating at said recording station a sequence of digital address signals corresponding respectively to addresses at the respective geophone stations for activating the switching units at the respective geophone stations through said communication means, means responsive to activation of said switching unit for applying both electrical seismic digital signals and corresponding digital address signals from said respective stations to said recording means from one station at a time through said communication means, whereby said signals are applied in time-multiplexed form to said common recording means at said recording station, and means in said recording device for recording said electrical seismic digital signals and said address signals in a coordinated manner on said recording medium.

2. In a seismic prospecting system as defined in claim 1:

wherein said converter means comprises means for generating said digital electrical seismic signals as a binary digital signals, each of which includes a plurality of amplitude indicating bits and a sign bit.

3. In a seismic prospecting system as defined in claim 1:

means at said recording station for addressing said geophone stations consecutively whereby said digital electrical seismic signals emitted from the respective geophone stations are transferred in time-multiplexed form to said recording station.

4. In a seismic prospecting system as defined in claim 1:

means at said recording station for addressing said geophones consecutively whereby such digital electrical seismic signals and associated address signals transferred in time-muultiplexed form through said communication system to said recording means.

5. A seismic system as defined in claim 1, wherein each said geophone comprises:

means responsive to such seismic wave for generating an electrical pulse that has a duration that varies in accordance with the magnitude of a characteristic of such seismic wave; and means including said converter means controlled in accordance with the duration of said electrical pule for generating a stream of high frequency pulses in a number corresponding to that magnitude; and means at said recording station for converting each said stream of high frequency pulses into a corresponding electrical seismic digital signal representative of said magnitude of such characteristic of such seismic wave.

6. In a seismic prospecting system as defined in claim 5, wherein said converter means comprises means for generating said digital electrical seismic signals in the form of binary digital signals each of which includes a plurality of amplitude indicating bits and a sign bit.

7. In a seismic prospecting system in which seismic waves are received at a plurality of geophone stations, digitized, and recorded in digital form on a magnetic recording medium at a recording station, the combination therein that comprises:

geophones located at such geophone stations connected by cable means to recording device at said recording station, an I/O transfer switch connecting the geophones at each station with said cable means, each said transfer switch having a signal inputting condition and a signal outputting condition whereby the switch may input signals from said cable means at each geophone station and may output signals from the geophone station to said cable means, means for normally setting each such transfer switch in its signal-inputting condition, a digital register at each geophone station and having stored therein a digital address that uniquely identifies each respective station, means at the recording station for generating any one of a number of digital address signals associated respectively with one or another of said geophone stations and for applying said address signals to said cable means for transmission to the geophone stations, means at each geophone station for coverting a received seismic wave into a digital electrical seismic signal, means at each geophone station for emitting the digital address unique to each geophone station in co-ordination with the emission of said digital electrical seismic signal therefrom for transmission over said cable means to said recording station, and control means at each geophone station responsive to an input address signal that matches the address unique to that station for changing said transfer switch from its inputting condition to its outputting condition and for emitting such an electrical digital signal to said cable means while the transfer switch is in its outputting condition and for then automatically restoring said transfer switch to its inputting condition.

8. In a seismic prospecting system as defined in claim 7, wherein said cable means includes a common pair of conductors connected to a plurality of said transfer switches whereby digital signals emitted from the respective geophone stations are transmitted to said recording station over said common pair of conductors.

9. In a seismic prospecting system as defined in claim 7:

means for addressing said geophone stations consecutively whereby said digital electrical seismic signals emitted from the respective geophone stations are transferred in time-multiplexed form over said cable means to said recording station.

10. In a seismic prospecting system in which seismic waves are received at a plurality of geophone stations, digitized, and recorded in digital form on a magnetic recording medium at a recording station, the combination therein that comprises:

geophones located at such geophone stations connected by cable means to a recording device at said recording station, an I/O transfer switch connecting the geophones at each station with said cable means, each said transfer switch having a signal inputting condition and a signal outputting condition whereby the switch may input signals from said cable means at each geophone station and may output signals from the geophone station to said cable means, means for normally setting each such transfer switch in its signal-inputting condition, said cable means including a common pair of conductors connected to a plurality of said transfer switches whereby digital signals emitted from the respective geophone stations are transmitted to said recording station over said common pair of conductors, a digital register at each geophone station and having stored therein a digital address that uniquely identifies each respective station, means at the recording station for generating any one of a number of digital address signals associated respectively with one or another of said geophone stations, for addressing said geophone stations consecutively whereby said digital electrical seismic signals and associated addresses are transferred in time-multiplexed form over said common pair of conductors to said recording means, and for applying said address signals to said cable means for transmission to the geophone stations, means at each geophone station for converting a received seismic wave into a digital electrical seismic signal, and control means at each geophone station responsive to an input address signal that matches the address unique to that station for changing said transfer switch from its inputting condition to its outputting condition and for emitting such an electrical digital signal to said cable means while the transfer switch is in its outputting condition and for then automatically restoring said transfer switch to its inputting condition.

11. In a seismic prospecting system in which seismic waves are received at a plurality of geophone stations and transmitted to a recording station, the combination therein that comprises:

geophones located at such geophone stations connected by a common caable to a recording device at said recording station, an I/O transfer switch connecting the geophones at each station with said common cable, each said transfer switch having a signal inputting condition and a signal outputting condition whereby said switch may input signals from said cable at each geophone station and may output signals from the geophone station to said cable, means for normally setting each such transfer switch in its signal-putting condition, a register associated with each geophone station and having stored therein an address that uniquely identifies each respective associated geophone station, generator means at the recording station for generating any one of a number of address signals associated respectively with one or another of said geophone stations and for applying said address signal to said common cable for transmission to the geophone stations, means at each geophone station for converting a received seismic wave into a digital electrical seismic signal and for emitting an address signal unique to each geophone station in coordination with the emission of said digital electrical seismic signal therefrom, control means at each geophone station responsive to an input address signal from said recording station that matches the address unique to that geophone station for changing said transfer switch from its inputting condition to its outputting condition and for emitting such a digital electrical seismic signal to said cable while the transfer switch is in said outputting condition, and means for restoring said transfer switch to its inputting condition.

12. In a seismic prospecting system as defined in claim 11:

wherein said cable means includes a common pair of conductors connected to a plurality of said transfer switches whereby said seismic signals emitted from the respective geophone stations are transmitted to said recording station over said common pair of conductors.

13. In a seismic prospecting system as defined in claim 11:

means in said generator means for addressing said geophone stations consecutively whereby such electrical signals emitted from the respective geophone stations are transferred in time-multiplexed form over said cable means to said recording station.

14. In a seismic prospecting system in which seismic waves are received at a plurality of geophone stations and transmitted to a recording station, the combination therein that comprises:

geophones located at such geophone stations connected by a common cable to a recording device at said recording station, an I/O transfer switch connecting the geophones at each station with said common cable, each said transfer switch having a signal inputting condition and a signal outputting condition whereby said switch may input signals from said cable at each geophone station and may output signals from the geophone station to said cable, means for normally setting each such transfer switch in its signal-inputting condition, a register associated with each geophone station and having stored therein an address that uniquely identifies each respective associated geophone station, generator means at the recording station for generating any one of a number of address signals associated respectively with one or another of said geophone stations and for applying said address signal to said common cable for transmission in the geophone stations, means at each geophone station for converting a received seismic wave into a digital electrical seismic signal, control means at each geophone station responsive to an input address signal from said recording station that matches the address unique to that geophone station for changing said transfer switch from its inputting condition to its outputting condition and for emitting such a digital electrical seismic signal to said cable while the transfer switch is in said outputting condition, means for restoring said transfer switch to its inputting condition, said cable means including a common pair of conductors connected to a plurality of said transfer switches whereby said seismic signals emitted from the respective geophone stations are transmitted to said recording station over said common pair of conductors, and means in said generator means for addressing said geophones consecutively whereby such electrical signals and associated address signals are transferred in time-multiplexed form over said common pair of conductors to said recording means.

15. In a seismic prospecting system in which seismic waves are received at a plurality of geophone stations, digitized, and recorded in digital form on a magnetic recording medium at a recording station, the combination therein that comprises:

geophones located at such stations connected by cable means to a recording device at said recording station, a digital register associated with each geophone station and having stored therein a digital signal that represents an address that uniquely identifies each respective station, converter means at each geophone station for converting a received seismic wave into an electrical seismic digital signal, a signal switching unit at each geophone station, means coupled to said digital register and said conversion means of each respective geophone station by such signal switching means when activated for applying a digital signal representative of said address and said electrical seismic digital signal to said cable means, and activating means for activating the switching units at the respective geophone stations one at a time whereby such digital signals are transmitted from the respective geophone stations in time-multiplexed form over said cable means to said recording station.

16. In a seismic prospecting system as defined in claim 15.

wherein said converter means comprises means for generating said digital electrical seismic signal as a binary digital signal that includes a plurality of amplitude indicating bits and a sign bit.

17. In a seismic prospecting system as defined in claim 15, wherein said activating means includes means for generating a sequence of digital address signals corresponding respectively to the addresses of said geophone stations.

18. In a seismic prospecting system as defined in claim 17, wherein said last mentioned means is located at said recording station.

19. In a method of seismic prospecting wherein seismic waves that are received at each of a plurality of seismic wave receiving stations are converted into corresponding electrical signals representing a characteristic of the received waves and the electrical signals are transferred to a recording station, the steps of:

(1) converting received seismic waves into digital electrical seismic signals at the respective geophone stations;

(2) generating address signals in digital form at the respective geophone stations, each address signal uniquely identifying a different geophone station, (3) intermittently generating at said recording station address signals of a plurality of such geophone stations successively whereby such geophone stations are correctly addressed one at a time, and (4) transmitting a binary digital electrical signal representing the address of each geophone station from the geophone at that station to said recording station concurrently with said transmission of a digital electrical seismic signal from said geophone station to said recording station, whereby digital electrical seismic signals are transmitted to said recording station from one geophone station at a time.

* * * * *